US008213782B2

(12) United States Patent
Jelinek

(10) Patent No.: US 8,213,782 B2
(45) Date of Patent: Jul. 3, 2012

(54) PREDICTIVE AUTOFOCUSING SYSTEM

(75) Inventor: Jan E. Jelinek, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 342 days.

(21) Appl. No.: 12/188,043

(22) Filed: Aug. 7, 2008

(65) Prior Publication Data

US 2010/0034529 A1 Feb. 11, 2010

(51) Int. Cl.
*A61B 3/14* (2006.01)
*G03B 3/10* (2006.01)
*G03B 13/36* (2006.01)

(52) U.S. Cl. ............. 396/18; 396/95; 396/153; 382/117

(58) Field of Classification Search ................ 396/18
See application file for complete search history.

(56) References Cited

U.S. PATENT DOCUMENTS

| | | | |
|---|---|---|---|
| 4,641,349 A | | 2/1987 | Flom et al. |
| 5,218,394 A | * | 6/1993 | Ueda et al. ............... 396/49 |
| 5,291,560 A | | 3/1994 | Daugman |
| 5,293,427 A | | 3/1994 | Ueno et al. |
| 5,359,382 A | * | 10/1994 | Uenaka ................. 396/95 |
| 5,404,013 A | * | 4/1995 | Tajima ................ 250/332 |
| 5,572,596 A | | 11/1996 | Wildes et al. |
| 5,608,472 A | | 3/1997 | Szirth et al. |
| 5,664,239 A | * | 9/1997 | Nakata ................... 396/104 |
| 5,687,031 A | | 11/1997 | Ishihara |
| 5,717,512 A | | 2/1998 | Chmielewski, Jr. et al. |
| 5,751,836 A | | 5/1998 | Wildes et al. |
| 5,859,686 A | | 1/1999 | Aboutalib et al. |
| 5,860,032 A | * | 1/1999 | Iwane .................. 396/95 |
| 5,896,174 A | * | 4/1999 | Nakata ................. 348/348 |
| 5,901,238 A | | 5/1999 | Matsuhita |
| 5,953,440 A | | 9/1999 | Zhang et al. |
| 5,956,122 A | | 9/1999 | Doster |
| 5,978,494 A | | 11/1999 | Zhang |
| 6,005,704 A | | 12/1999 | Chmielewski, Jr. et al. |

(Continued)

FOREIGN PATENT DOCUMENTS

EP 0878780 11/1998

(Continued)

OTHER PUBLICATIONS

Bonney et al., "Iris Pattern Extraction Using Bit Planes and Standard Deviations," IEEE, pp. 582-586, 2004.

(Continued)

*Primary Examiner* — Clayton E Laballe
*Assistant Examiner* — Bret Adams
(74) *Attorney, Agent, or Firm* — Seager, Tufte & Wickhem LLC

(57) ABSTRACT

A system for providing a predictive autofocus prior to capturing an image of an iris of a subject. A sequence of images of the subject may be taken with a visible light sensitive camera. A speed and/or location of the subject may be estimated from the images. An encounter may be when the subject is within focus of the camera or, in other words, a focus distance and subject distance coincide. The focus may be determined in accordance with an intensity variance determination of the subject in the image, and more particularly of a subject's eye within a window of an image. Upon an encounter, an image of the iris of the eye may be captured with an infrared sensitive camera.

17 Claims, 21 Drawing Sheets

U.S. PATENT DOCUMENTS

| | | |
|---|---|---|
| 6,007,202 A | 12/1999 | Apple et al. |
| 6,012,376 A | 1/2000 | Hanke et al. |
| 6,021,210 A | 2/2000 | Camus et al. |
| 6,028,949 A | 2/2000 | McKendall |
| 6,055,322 A | 4/2000 | Salganicoff et al. |
| 6,064,752 A | 5/2000 | Rozmus et al. |
| 6,069,967 A | 5/2000 | Rozmus et al. |
| 6,081,607 A | 6/2000 | Mori et al. |
| 6,088,470 A | 7/2000 | Camus et al. |
| 6,091,899 A | 7/2000 | Konishi et al. |
| 6,101,477 A | 8/2000 | Hohle et al. |
| 6,104,431 A | 8/2000 | Inoue et al. |
| 6,108,636 A | 8/2000 | Yap et al. |
| 6,119,096 A | 9/2000 | Mann et al. |
| 6,120,461 A | 9/2000 | Smyth |
| 6,144,754 A | 11/2000 | Okano et al. |
| 6,246,751 B1 | 6/2001 | Bergl et al. |
| 6,247,813 B1 | 6/2001 | Kim et al. |
| 6,252,977 B1 | 6/2001 | Salganicoff et al. |
| 6,259,478 B1 | 7/2001 | Hori |
| 6,282,475 B1 | 8/2001 | Washington |
| 6,285,505 B1 | 9/2001 | Melville et al. |
| 6,285,780 B1 | 9/2001 | Yamakita et al. |
| 6,289,113 B1 | 9/2001 | McHugh et al. |
| 6,299,306 B1 | 10/2001 | Braithwaite et al. |
| 6,308,015 B1 | 10/2001 | Matsumoto |
| 6,309,069 B1 | 10/2001 | Seal et al. |
| 6,320,610 B1 | 11/2001 | Van Sant et al. |
| 6,320,612 B1 | 11/2001 | Young |
| 6,320,973 B2 | 11/2001 | Suzaki et al. |
| 6,323,761 B1 | 11/2001 | Son |
| 6,325,765 B1 | 12/2001 | Hay et al. |
| 6,330,674 B1 | 12/2001 | Angelo et al. |
| 6,332,193 B1 | 12/2001 | Glass et al. |
| 6,344,683 B1 | 2/2002 | Kim |
| 6,370,260 B1 | 4/2002 | Pavlidis et al. |
| 6,377,699 B1 | 4/2002 | Musgrave et al. |
| 6,400,835 B1 | 6/2002 | Lemelson et al. |
| 6,424,727 B1 | 7/2002 | Musgrave et al. |
| 6,424,845 B1 | 7/2002 | Emmoft et al. |
| 6,433,818 B1 | 8/2002 | Steinberg et al. |
| 6,438,752 B1 | 8/2002 | McClard |
| 6,441,482 B1 | 8/2002 | Foster |
| 6,446,045 B1 | 9/2002 | Stone et al. |
| 6,483,930 B1 | 11/2002 | Musgrave et al. |
| 6,484,936 B1 | 11/2002 | Nicoll et al. |
| 6,490,443 B1 | 12/2002 | Freeny, Jr. |
| 6,493,669 B1 | 12/2002 | Curry et al. |
| 6,494,363 B1 | 12/2002 | Roger et al. |
| 6,503,163 B1 | 1/2003 | Van Sant et al. |
| 6,505,193 B1 | 1/2003 | Musgrave et al. |
| 6,506,078 B1 | 1/2003 | Mori et al. |
| 6,516,078 B1 | 2/2003 | Yang et al. |
| 6,516,087 B1 | 2/2003 | Camus |
| 6,516,416 B2 | 2/2003 | Gregg et al. |
| 6,522,772 B1 | 2/2003 | Morrison et al. |
| 6,523,165 B2 | 2/2003 | Liu et al. |
| 6,526,160 B1 | 2/2003 | Ito |
| 6,532,298 B1 | 3/2003 | Cambier et al. |
| 6,540,392 B1 | 4/2003 | Braithwaite |
| 6,542,624 B1 | 4/2003 | Oda |
| 6,546,121 B1 | 4/2003 | Oda |
| 6,553,494 B1 | 4/2003 | Glass |
| 6,580,356 B1 | 6/2003 | Alt et al. |
| 6,591,001 B1 | 7/2003 | Oda et al. |
| 6,591,064 B2 | 7/2003 | Higashiyama et al. |
| 6,594,377 B1 | 7/2003 | Kim et al. |
| 6,594,399 B1 | 7/2003 | Camus et al. |
| 6,598,971 B2 | 7/2003 | Cleveland |
| 6,600,878 B2 * | 7/2003 | Pregara ............... 396/111 |
| 6,614,919 B1 | 9/2003 | Suzaki et al. |
| 6,652,099 B2 | 11/2003 | Chae et al. |
| 6,674,367 B2 | 1/2004 | Sweatte |
| 6,690,997 B2 | 2/2004 | Rivalto |
| 6,708,176 B2 | 3/2004 | Strunk et al. |
| 6,714,665 B1 | 3/2004 | Hanna et al. |
| 6,718,049 B2 | 4/2004 | Pavlidis et al. |
| 6,732,278 B2 | 5/2004 | Baird, III et al. |
| 6,734,783 B1 | 5/2004 | Anbai |
| 6,745,520 B2 | 6/2004 | Puskaric et al. |
| 6,750,435 B2 | 6/2004 | Ford |
| 6,751,733 B1 | 6/2004 | Nakamura et al. |
| 6,753,919 B1 * | 6/2004 | Daugman ................. 348/345 |
| 6,754,640 B2 | 6/2004 | Bozeman |
| 6,760,467 B1 | 7/2004 | Min et al. |
| 6,765,470 B2 | 7/2004 | Shinzaki |
| 6,766,041 B2 | 7/2004 | Golden et al. |
| 6,775,774 B1 | 8/2004 | Harper |
| 6,785,406 B1 | 8/2004 | Kamada |
| 6,793,134 B2 | 9/2004 | Clark |
| 6,819,219 B1 | 11/2004 | Bolle et al. |
| 6,829,370 B1 | 12/2004 | Pavlidis et al. |
| 6,832,044 B2 | 12/2004 | Doi et al. |
| 6,836,554 B1 | 12/2004 | Bolle et al. |
| 6,837,436 B2 | 1/2005 | Swartz et al. |
| 6,845,479 B2 | 1/2005 | Park |
| 6,853,444 B2 | 2/2005 | Haddad |
| 6,867,683 B2 | 3/2005 | Calvesio et al. |
| 6,873,960 B1 | 3/2005 | Wood et al. |
| 6,896,187 B2 | 5/2005 | Stockhammer |
| 6,905,411 B2 | 6/2005 | Nguyen et al. |
| 6,920,237 B2 | 7/2005 | Chen et al. |
| 6,930,707 B2 | 8/2005 | Bates et al. |
| 6,934,849 B2 | 8/2005 | Kramer et al. |
| 6,954,738 B2 | 10/2005 | Wang et al. |
| 6,957,341 B2 | 10/2005 | Rice et al. |
| 6,972,797 B2 | 12/2005 | Izumi |
| 6,992,562 B2 | 1/2006 | Fuks et al. |
| 6,992,717 B2 * | 1/2006 | Hatano ................. 348/333.03 |
| 7,030,351 B2 | 4/2006 | Wasserman et al. |
| 7,053,948 B2 | 5/2006 | Konishi |
| 7,084,904 B2 | 8/2006 | Liu et al. |
| 7,183,895 B2 | 2/2007 | Bazakos et al. |
| 7,184,577 B2 | 2/2007 | Chen et al. |
| 7,204,425 B2 | 4/2007 | Mosher, Jr. et al. |
| 7,277,561 B2 | 10/2007 | Shin |
| 7,362,210 B2 | 4/2008 | Bazakos et al. |
| 7,418,115 B2 | 8/2008 | Northcott et al. |
| 7,421,097 B2 | 9/2008 | Hamza et al. |
| 7,460,693 B2 | 12/2008 | Loy et al. |
| 7,471,451 B2 | 12/2008 | Dent et al. |
| 7,486,806 B2 | 2/2009 | Azuma et al. |
| 7,537,568 B2 | 5/2009 | Moehring |
| 7,538,326 B2 | 5/2009 | Johnson et al. |
| 7,722,461 B2 | 5/2010 | Gatto et al. |
| 2001/0026632 A1 | 10/2001 | Tamai |
| 2001/0027116 A1 | 10/2001 | Baird |
| 2001/0047479 A1 | 11/2001 | Bromba et al. |
| 2001/0051924 A1 | 12/2001 | Uberti |
| 2001/0054154 A1 | 12/2001 | Tam |
| 2002/0010857 A1 | 1/2002 | Karthik |
| 2002/0033896 A1 | 3/2002 | Hatano |
| 2002/0039433 A1 | 4/2002 | Shin |
| 2002/0040434 A1 | 4/2002 | Elliston et al. |
| 2002/0062280 A1 | 5/2002 | Zachariassen et al. |
| 2002/0077841 A1 | 6/2002 | Thompson |
| 2002/0089157 A1 | 7/2002 | Breed et al. |
| 2002/0106113 A1 | 8/2002 | Park |
| 2002/0112177 A1 | 8/2002 | Voltmer et al. |
| 2002/0114495 A1 | 8/2002 | Chen et al. |
| 2002/0130961 A1 | 9/2002 | Lee et al. |
| 2002/0131622 A1 | 9/2002 | Lee et al. |
| 2002/0139842 A1 | 10/2002 | Swaine |
| 2002/0140715 A1 | 10/2002 | Smet |
| 2002/0142844 A1 | 10/2002 | Kerr |
| 2002/0144128 A1 | 10/2002 | Rahman et al. |
| 2002/0150281 A1 | 10/2002 | Cho |
| 2002/0154794 A1 | 10/2002 | Cho |
| 2002/0158750 A1 | 10/2002 | Almalik |
| 2002/0164054 A1 | 11/2002 | McCartney et al. |
| 2002/0175182 A1 | 11/2002 | Matthews |
| 2002/0186131 A1 | 12/2002 | Fettis |
| 2002/0191075 A1 | 12/2002 | Doi et al. |
| 2002/0191076 A1 | 12/2002 | Wada et al. |
| 2002/0194128 A1 | 12/2002 | Maritzen et al. |
| 2002/0194131 A1 | 12/2002 | Dick |
| 2002/0198731 A1 | 12/2002 | Barnes et al. |

| | | | | | |
|---|---|---|---|---|---|
| 2003/0002714 A1 | 1/2003 | Wakiyama | 2003/0236120 A1 | 12/2003 | Reece et al. |
| 2003/0012413 A1 | 1/2003 | Kusakari et al. | 2004/0001614 A1 | 1/2004 | Russon et al. |
| 2003/0014372 A1 | 1/2003 | Wheeler et al. | 2004/0002894 A1 | 1/2004 | Kocher |
| 2003/0020828 A1 | 1/2003 | Ooi et al. | 2004/0005078 A1 | 1/2004 | Tillotson |
| 2003/0038173 A1 | 2/2003 | Blackson et al. | 2004/0006553 A1 | 1/2004 | de Vries et al. |
| 2003/0046228 A1 | 3/2003 | Berney | 2004/0010462 A1 | 1/2004 | Moon et al. |
| 2003/0053663 A1 | 3/2003 | Chen et al. | 2004/0012760 A1 | 1/2004 | Mihashi et al. |
| 2003/0055689 A1 | 3/2003 | Block et al. | 2004/0019570 A1 | 1/2004 | Bolle et al. |
| 2003/0055787 A1 | 3/2003 | Fujii | 2004/0023664 A1 | 2/2004 | Mirouze et al. |
| 2003/0058492 A1 | 3/2003 | Wakiyama | 2004/0023709 A1 | 2/2004 | Beaulieu et al. |
| 2003/0061172 A1 | 3/2003 | Robinson | 2004/0025030 A1 | 2/2004 | Corbett-Clark et al. |
| 2003/0061233 A1 | 3/2003 | Manasse et al. | 2004/0025031 A1 | 2/2004 | Ooi et al. |
| 2003/0065626 A1 | 4/2003 | Allen | 2004/0025053 A1 | 2/2004 | Hayward |
| 2003/0071743 A1 | 4/2003 | Seah et al. | 2004/0029564 A1 | 2/2004 | Hodge |
| 2003/0072475 A1 | 4/2003 | Tamori | 2004/0030930 A1 | 2/2004 | Nomura |
| 2003/0073499 A1 | 4/2003 | Reece | 2004/0035123 A1 | 2/2004 | Kim et al. |
| 2003/0074317 A1 | 4/2003 | Hofi | 2004/0037450 A1 | 2/2004 | Bradski |
| 2003/0074326 A1 | 4/2003 | Byers | 2004/0039914 A1 | 2/2004 | Barr et al. |
| 2003/0076161 A1 | 4/2003 | Tisse | 2004/0042641 A1 | 3/2004 | Jakubowski |
| 2003/0076300 A1 | 4/2003 | Lauper et al. | 2004/0044627 A1 | 3/2004 | Russell et al. |
| 2003/0076984 A1 | 4/2003 | Tisse et al. | 2004/0046640 A1 | 3/2004 | Jourdain et al. |
| 2003/0080194 A1 | 5/2003 | O'Hara et al. | 2004/0049687 A1 | 3/2004 | Orsini et al. |
| 2003/0091215 A1 | 5/2003 | Lauper et al. | 2004/0050924 A1 | 3/2004 | Mletzko et al. |
| 2003/0092489 A1 | 5/2003 | Veradej | 2004/0050930 A1 | 3/2004 | Rowe |
| 2003/0095689 A1 | 5/2003 | Volkommer et al. | 2004/0052405 A1 | 3/2004 | Walfridsson |
| 2003/0098776 A1 | 5/2003 | Friedli | 2004/0052418 A1 | 3/2004 | DeLean |
| 2003/0099379 A1 | 5/2003 | Monk et al. | 2004/0059590 A1 | 3/2004 | Mercredi et al. |
| 2003/0099381 A1 | 5/2003 | Ohba | 2004/0059953 A1 | 3/2004 | Purnell |
| 2003/0103652 A1 | 6/2003 | Lee et al. | 2004/0104266 A1 | 6/2004 | Bolle et al. |
| 2003/0107097 A1 | 6/2003 | McArthur et al. | 2004/0117636 A1 | 6/2004 | Cheng |
| 2003/0107645 A1 | 6/2003 | Yoon | 2004/0133804 A1 | 7/2004 | Smith et al. |
| 2003/0108224 A1 | 6/2003 | Ike | 2004/0146187 A1 | 7/2004 | Jeng |
| 2003/0108225 A1 | 6/2003 | Li | 2004/0148526 A1 | 7/2004 | Sands et al. |
| 2003/0115148 A1 | 6/2003 | Takhar | 2004/0160518 A1 | 8/2004 | Park |
| 2003/0115459 A1 | 6/2003 | Monk | 2004/0162870 A1 | 8/2004 | Matsuzaki et al. |
| 2003/0116630 A1 | 6/2003 | Carey et al. | 2004/0162984 A1 | 8/2004 | Freeman et al. |
| 2003/0118212 A1 | 6/2003 | Min et al. | 2004/0169817 A1 | 9/2004 | Grotehusmann et al. |
| 2003/0118217 A1 | 6/2003 | Kondo et al. | 2004/0172541 A1 | 9/2004 | Ando et al. |
| 2003/0123711 A1 | 7/2003 | Kim et al. | 2004/0174070 A1 | 9/2004 | Voda et al. |
| 2003/0125054 A1 | 7/2003 | Garcia | 2004/0190759 A1 | 9/2004 | Caldwell |
| 2003/0125057 A1 | 7/2003 | Pesola | 2004/0193893 A1 | 9/2004 | Braithwaite et al. |
| 2003/0126560 A1 | 7/2003 | Kurapati et al. | 2004/0219902 A1 | 11/2004 | Lee et al. |
| 2003/0131245 A1 | 7/2003 | Linderman | 2004/0233038 A1 | 11/2004 | Beenau et al. |
| 2003/0131265 A1 | 7/2003 | Bhakta | 2004/0240711 A1 | 12/2004 | Hamza et al. |
| 2003/0133597 A1 | 7/2003 | Moore et al. | 2004/0252866 A1 | 12/2004 | Tisse et al. |
| 2003/0140235 A1 | 7/2003 | Immega et al. | 2004/0255168 A1 | 12/2004 | Murashita et al. |
| 2003/0140928 A1 | 7/2003 | Bui et al. | 2005/0008200 A1 | 1/2005 | Azuma et al. |
| 2003/0141411 A1 | 7/2003 | Pandya et al. | 2005/0008201 A1 | 1/2005 | Lee et al. |
| 2003/0149881 A1 | 8/2003 | Patel et al. | 2005/0029353 A1 | 2/2005 | Isemura et al. |
| 2003/0152251 A1 | 8/2003 | Ike | 2005/0052566 A1 | 3/2005 | Kato |
| 2003/0152252 A1 | 8/2003 | Kondo et al. | 2005/0055582 A1 | 3/2005 | Bazakos et al. |
| 2003/0156741 A1 | 8/2003 | Lee et al. | 2005/0063567 A1 | 3/2005 | Saitoh et al. |
| 2003/0158762 A1 | 8/2003 | Wu | 2005/0084137 A1 | 4/2005 | Kim et al. |
| 2003/0158821 A1 | 8/2003 | Maia | 2005/0084179 A1 | 4/2005 | Hanna et al. |
| 2003/0159051 A1 | 8/2003 | Hollnagel | 2005/0099288 A1 | 5/2005 | Spitz et al. |
| 2003/0163739 A1 | 8/2003 | Armington et al. | 2005/0102502 A1 | 5/2005 | Sagen |
| 2003/0169334 A1 | 9/2003 | Braithwaite et al. | 2005/0110610 A1 | 5/2005 | Bazakos et al. |
| 2003/0169901 A1 | 9/2003 | Pavlidis et al. | 2005/0125258 A1 | 6/2005 | Yellin et al. |
| 2003/0169907 A1 | 9/2003 | Edwards et al. | 2005/0127161 A1 | 6/2005 | Smith et al. |
| 2003/0173408 A1 | 9/2003 | Mosher, Jr. et al. | 2005/0129286 A1 | 6/2005 | Hekimian |
| 2003/0174049 A1 | 9/2003 | Beigel et al. | 2005/0134796 A1 | 6/2005 | Zelvin et al. |
| 2003/0177051 A1 | 9/2003 | Driscoll et al. | 2005/0138385 A1 | 6/2005 | Friedli et al. |
| 2003/0182151 A1 | 9/2003 | Taslitz | 2005/0138387 A1 | 6/2005 | Lam et al. |
| 2003/0182182 A1 | 9/2003 | Kocher | 2005/0146640 A1 | 7/2005 | Shibata |
| 2003/0189480 A1 | 10/2003 | Hamid | 2005/0151620 A1 | 7/2005 | Neumann |
| 2003/0189481 A1 | 10/2003 | Hamid | 2005/0152583 A1 | 7/2005 | Kondo et al. |
| 2003/0191949 A1 | 10/2003 | Odagawa | 2005/0193212 A1 | 9/2005 | Yuhara |
| 2003/0194112 A1 | 10/2003 | Lee | 2005/0199708 A1 | 9/2005 | Friedman |
| 2003/0195935 A1 | 10/2003 | Leeper | 2005/0206501 A1 | 9/2005 | Farhat |
| 2003/0198368 A1 | 10/2003 | Kee | 2005/0206502 A1 | 9/2005 | Bernitz |
| 2003/0200180 A1 | 10/2003 | Phelan, III et al. | 2005/0207614 A1 | 9/2005 | Schonberg et al. |
| 2003/0210139 A1 | 11/2003 | Brooks et al. | 2005/0210267 A1 | 9/2005 | Sugano et al. |
| 2003/0210802 A1 | 11/2003 | Schuessier | 2005/0210270 A1 | 9/2005 | Rohatgi et al. |
| 2003/0218719 A1 | 11/2003 | Abourizk et al. | 2005/0210271 A1 | 9/2005 | Chou et al. |
| 2003/0225711 A1 | 12/2003 | Paping | 2005/0238214 A1 | 10/2005 | Matsuda et al. |
| 2003/0228898 A1 | 12/2003 | Rowe | 2005/0240778 A1 | 10/2005 | Saito |
| 2003/0233556 A1 | 12/2003 | Angelo et al. | 2005/0248725 A1 | 11/2005 | Ikoma et al. |
| 2003/0235326 A1 | 12/2003 | Morikawa et al. | 2005/0249385 A1 | 11/2005 | Kondo et al. |
| 2003/0235411 A1 | 12/2003 | Morikawa et al. | 2005/0255840 A1 | 11/2005 | Markham |

| | | | | | | |
|---|---|---|---|---|---|---|
| 2006/0165266 | A1 | 7/2006 | Hamza | JP | 2002153445 | 5/2002 |
| 2006/0274919 | A1 | 12/2006 | LoIacono et al. | JP | 2002260071 | 9/2002 |
| 2007/0036397 | A1 | 2/2007 | Hamza | JP | 2002271689 | 9/2002 |
| 2007/0140531 | A1 | 6/2007 | Hamza | JP | 2002286650 | 10/2002 |
| 2007/0189582 | A1 | 8/2007 | Hamza et al. | JP | 2002312772 | 10/2002 |
| 2007/0211924 | A1 | 9/2007 | Hamza | JP | 2002329204 | 11/2002 |
| 2008/0075334 | A1 | 3/2008 | Determan et al. | JP | 2003006628 | 1/2003 |
| 2008/0075445 | A1* | 3/2008 | Whillock et al. ............ 396/106 | JP | 2003036434 | 2/2003 |
| 2008/0104415 | A1 | 5/2008 | Palti-Wasserman et al. | JP | 2003108720 | 4/2003 |
| 2008/0148030 | A1 | 6/2008 | Goffin | JP | 2003108983 | 4/2003 |
| 2009/0046899 | A1 | 2/2009 | Northcott et al. | JP | 2003132355 | 5/2003 |
| | | | | JP | 2003150942 | 5/2003 |
| FOREIGN PATENT DOCUMENTS | | | | JP | 2003153880 | 5/2003 |
| EP | | 0910986 | 4/1999 | JP | 2003242125 | 8/2003 |
| EP | | 0962894 | 12/1999 | JP | 2003271565 | 9/2003 |
| EP | | 1018297 | 7/2000 | JP | 2003271940 | 9/2003 |
| EP | | 1024463 | 8/2000 | JP | 2003308522 | 10/2003 |
| EP | | 1028398 | 8/2000 | JP | 2003308523 | 10/2003 |
| EP | | 1041506 | 10/2000 | JP | 2003317102 | 11/2003 |
| EP | | 1041523 | 10/2000 | JP | 2003331265 | 11/2003 |
| EP | | 1126403 | 8/2001 | JP | 2004005167 | 1/2004 |
| EP | | 1477925 | 11/2004 | JP | 2004021406 | 1/2004 |
| GB | | 2369205 | 5/2002 | JP | 2004030334 | 1/2004 |
| GB | | 2371396 | 7/2002 | JP | 2004038305 | 2/2004 |
| GB | | 2375913 | 11/2002 | JP | 2004094575 | 3/2004 |
| GB | | 2402840 | 12/2004 | JP | 2004152046 | 5/2004 |
| GB | | 2411980 | 9/2005 | JP | 2004163356 | 6/2004 |
| JP | | 9161135 | 6/1997 | JP | 2004164483 | 6/2004 |
| JP | | 9198545 | 7/1997 | JP | 2004171350 | 6/2004 |
| JP | | 9201348 | 8/1997 | JP | 2004171602 | 6/2004 |
| JP | | 9147233 | 9/1997 | JP | 2004206444 | 7/2004 |
| JP | | 9234264 | 9/1997 | JP | 2004220376 | 8/2004 |
| JP | | 9305765 | 11/1997 | JP | 2004261515 | 9/2004 |
| JP | | 9319927 | 12/1997 | JP | 2004280221 | 10/2004 |
| JP | | 10021392 | 1/1998 | JP | 2004280547 | 10/2004 |
| JP | | 10040386 | 2/1998 | JP | 2004287621 | 10/2004 |
| JP | | 10049728 | 2/1998 | JP | 2004315127 | 11/2004 |
| JP | | 10137219 | 5/1998 | JP | 2004318248 | 11/2004 |
| JP | | 10137221 | 5/1998 | JP | 2005004524 | 1/2005 |
| JP | | 10137222 | 5/1998 | JP | 2005011207 | 1/2005 |
| JP | | 10137223 | 5/1998 | JP | 2005025577 | 1/2005 |
| JP | | 10248827 | 9/1998 | JP | 2005038257 | 2/2005 |
| JP | | 10269183 | 10/1998 | JP | 2005062990 | 3/2005 |
| JP | | 11047117 | 2/1999 | JP | 2005115961 | 4/2005 |
| JP | | 11089820 | 4/1999 | JP | 2005148883 | 6/2005 |
| JP | | 11200684 | 7/1999 | JP | 2005242677 | 9/2005 |
| JP | | 11203478 | 7/1999 | WO | WO 97/17674 | 5/1997 |
| JP | | 11213047 | 8/1999 | WO | WO 98/02083 | 1/1998 |
| JP | | 11339037 | 12/1999 | WO | WO 98/08439 | 3/1998 |
| JP | | 2000005149 | 1/2000 | WO | WO 99/32317 | 7/1999 |
| JP | | 2000005150 | 1/2000 | WO | WO 99/52422 | 10/1999 |
| JP | | 2000011163 | 1/2000 | WO | WO 99/65175 | 12/1999 |
| JP | | 2000023946 | 1/2000 | WO | WO 00/28484 | 5/2000 |
| JP | | 2000083930 | 3/2000 | WO | WO 00/29986 | 5/2000 |
| JP | | 2000102510 | 4/2000 | WO | WO 00/31677 | 6/2000 |
| JP | | 2000102524 | 4/2000 | WO | WO 00/36605 | 6/2000 |
| JP | | 2000105830 | 4/2000 | WO | WO 01/01329 | 1/2001 |
| JP | | 2000107156 | 4/2000 | WO | WO 01/03100 | 1/2001 |
| JP | | 2000139878 | 5/2000 | WO | WO 01/28476 | 4/2001 |
| JP | | 2000155863 | 6/2000 | WO | WO 01/35348 | 5/2001 |
| JP | | 2000182050 | 6/2000 | WO | WO 01/35349 | 5/2001 |
| JP | | 2000185031 | 7/2000 | WO | WO 01/40982 | 6/2001 |
| JP | | 2000194972 | 7/2000 | WO | WO 01/63994 | 8/2001 |
| JP | | 2000237167 | 9/2000 | WO | WO 01/69490 | 9/2001 |
| JP | | 2000242788 | 9/2000 | WO | WO 01/86599 | 11/2001 |
| JP | | 2000259817 | 9/2000 | WO | WO 02/01451 | 1/2002 |
| JP | | 2000356059 | 12/2000 | WO | WO 02/19030 | 3/2002 |
| JP | | 2000357232 | 12/2000 | WO | WO 02/35452 | 5/2002 |
| JP | | 2001005948 | 1/2001 | WO | WO 02/35480 | 5/2002 |
| JP | | 2001067399 | 3/2001 | WO | WO 02/091735 | 11/2002 |
| JP | | 2001101429 | 4/2001 | WO | WO 02/095657 | 11/2002 |
| JP | | 2001167275 | 6/2001 | WO | WO 03/002387 | 1/2003 |
| JP | | 2001222661 | 8/2001 | WO | WO 03/054777 | 7/2003 |
| JP | | 2001292981 | 10/2001 | WO | WO 03/077077 | 9/2003 |
| JP | | 2001297177 | 10/2001 | WO | WO 2004/029863 | 4/2004 |
| JP | | 2001358987 | 12/2001 | WO | WO 2004/042646 | 5/2004 |
| JP | | 2002119477 | 4/2002 | WO | WO 2004/055737 | 7/2004 |
| JP | | 2002133415 | 5/2002 | WO | WO 2004/089214 | 10/2004 |
| JP | | 2002153444 | 5/2002 | WO | WO 2004/097743 | 11/2004 |

| | | |
|---|---|---|
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/023046 | 3/2006 |
| WO | WO 2006/063076 | 6/2006 |

OTHER PUBLICATIONS

Camus et al., "Reliable and Fast Eye Finding in Close-up Images," IEEE, pp. 389-394, 2002.
Cui et al., "A Fast and Robust Iris Localization Method Based on Texture Segmentation," 8 pages, 2004.
Cui et al., "An Appearance-Based Method for Iris Detection," 6 pages, 2004.
Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.
Cui et al., "An Iris Image Synthesis Method Based on PCA and Super-Resolution," IEEE Computer Society, Proceedings of the 17th International Conference on Pattern Recognition, 6 pages, Aug. 23-26, 2004.
Cui et al., "An Iris Recognition Algorithm Using Local Extreme Points," Biometric Authentication, First International Conference, ICBA 2004, Hong Kong, China, 10 pages, Jul. 15-17, 2004.
Daugman, "Results From 200 Billion Iris Cross-Comparisons," University of Cambridge Computer Laboratory, Technical Report, No. 635, 8 pages, Jun. 2005.
Du et al., "A One-Dimensional Approach for Iris Identification," 11 pages, prior to Jan. 25, 2006.
http://www.newscientisttech.com/article/dn11110-invention-covert-iris-sc, "Invention: Covert Iris Scanner," 3 pages, printed Feb. 8, 2007.
Huang et al., "Iris Model Based on Local Orientation Description," 5 pages, prior to Jan. 25, 2006.
Huang et al., "An Efficient Iris Recognition System," IEEE Proceedings of the First International Conference on Machine Learning and Cybemetics, Beijing, pp. 450-454, Nov. 4-5, 2002.
Ma et al., "Personal Identification Based on Iris Texture Analysis," IEEE Transactions on Pattern Analysis and Machine Intelligence, vol. 25, No. 12, pp. 1519-1533, Dec. 2003.
Masek, "Recognition of Human Iris Patterns for Biometric Identification," 61 pages, 2003.
Sun et al., "Robust Encoding of Local Ordinal Measures: A General Framework of Iris Recognition," 13 pages, prior to Jan. 25, 2006.
Avcibas et al., "Steganalysis Using Image Quality Metrics," IEEE Transactions on Image Processing, vol. 12, No. 2, pp. 221-229, Feb. 2003.
Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.
Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.
Daugman, "How Iris Recognition Works," IEEE 2002 International Conference on Image Processing, vol. I of III, 6 pages, Sep. 22-25, 2002.
Guo et al., "A System for Automatic Iris Capturing," Mitsubishi Electric Research Laboratories, Inc., 10 pages, 2005.
Guo, "Face, Expression, and Iris Recognition Using Learning-Based Approaches," 132 pages, 2006.
Jalaja et al., "Texture Element Feature Characterizations for CBIR," IEEE, pp. 733-736, 2005.
Kalka et al., "Image Quality Assessment for Iris Biometric," Proc. of SPIE vol. 6202 62020D, 11 pages, 2006.
Ko et al., "Monitoring and Reporting of Fingerprint Image Quality and Match Accuracy for a Large User Application," IEEE Computer Society, Proceedings of the $33^{rd}$ Applied Imagery Pattern Recognition Workshop, 6 pages, 2004.
Lau et al., "Finding a Small Number of Regions in an Image Using Low-Level Features," Pattern Recognition 35, pp. 2323-2339, 2002.
Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.
Oppenheim et al, "The Importance of Phase in Signals," Proceedings of the IEEE, vol. 69, No. 5, pp. 529-541, 1981.
Ratha et al., "A Real-Time Matching System for Large Fingerprint Databases," IEEE Transactions on Pattern Analysis, and Machine Intelligence, vol. 18, No. 8, pp. 799-812, Aug. 1996.
Sony, "Network Color Camera, SNC-RZ30N (NTSC)," 6 pages, Aug. 2002.
Wang et al, "Image Quality Assessment: From Error Visibility to Structural Similarity," IEEE Transactions on Image Processing, vol. 13, No. 4, pp. 600-612, Apr. 2004.
Wang et al., "A Universal Image Quality Index," IEEE Signal Processing Letters, vol. 9, No. 3, pp. 81-84, Mar. 2002.
Wang et al., "Local Phase Coherence and the Perception of Blur," Advances in Nueral Information Processing Systems 16, pp. 1435-1442, 2004.
U.S. Appl. No. 13/077,821, filed Mar. 30, 2011.
Freeboy, "Adaptive Optics Speeds Up Airport Immigration," Optics.org/ole, 2 pages, Jan. 2009.
http://www.imagine-eyes.com/content/view/100/115/, "INOVEO— Ultra-High Resolution Retinal Imaging with Adaptive Optics," 2 pages, printed Feb. 22, 2010.

* cited by examiner

PREDICTIVE AUTOFOCUSING SYSTEM

The U.S. Government may have rights in the present invention.

BACKGROUND

The present invention pertains to capturing images and particularly capturing images of subjects. More particularly, the invention pertains to focusing for such images.

SUMMARY

The invention is a predictive autofocusing system for still or moving subjects using image data.

DESCRIPTION

Figure 1:
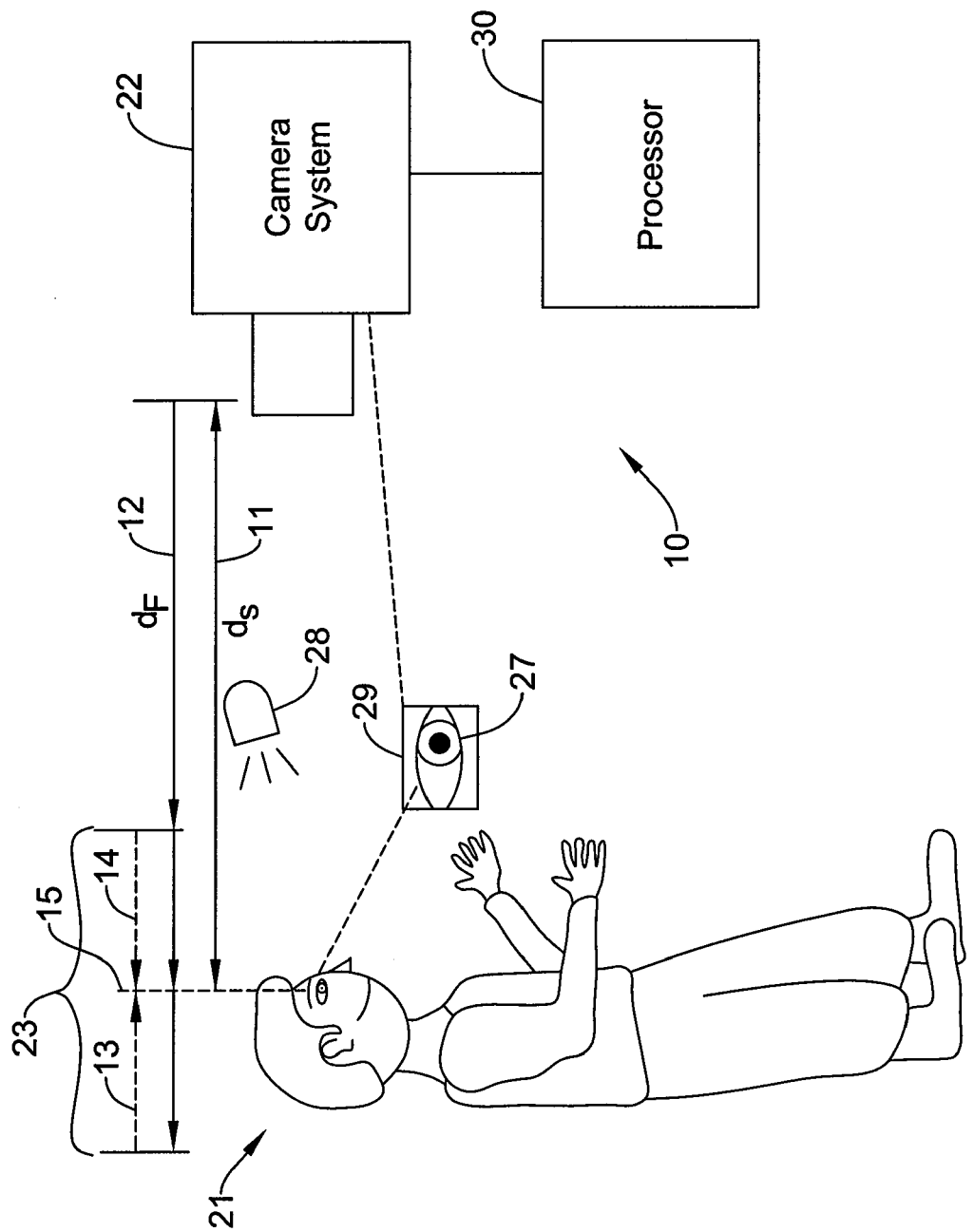
FIG. 1 is a diagram of a layout for the present predictive autofocusing system.

An iris recognition system may work with iris images acquired in the near infrared (NIR) spectrum. NIR illumination may be provided by a special flash. An operational scenario of the system appears to raise a question, namely, how to focus an iris camera. First, given its very small depth of field, the iris camera should be focused on a particular eye being photographed. Second, the focusing should be done prior to the flash discharge, using only ambient light. Third, determining the correct focus and adjusting the lens to achieve the focus may take a certain amount of time. If the subject is moving, the time needed to do the focusing should be properly accounted for relative to the subject speed, if the system is to produce well focused iris images. An autofocusing system should predict where the subject's eye is going to be in the near future and calculate the nearest time when its lens' focus can "catch up" with the eye given the system's computational and physical limitations.

The autofocusing approach of the present system may operate on optical principles, i.e., such approach does not necessarily explicitly measure the distance to the subject using a ranging device like lidar. The approach may be based on trial-and-error techniques when the system takes a few test images using different focus settings and uses the information gleaned from them to determine both the correct focus lens position and when to fire the iris camera shot.

Predictive autofocusing may involve several phases. In phase 1, the system may take a sequence of test images and use the sequence to estimate the subject's position and/or speed relative to the camera. In phase 2, the position and/or speed may be used to solve a dynamic pursuer-evader problem, whose solution is the location and/or time of their earliest encounter. Here, the pursuer may be the camera focus, which is "chasing" the "evading" subject. As with any evader-pursuer problem, the solution should be computed ahead of real time to allow the pursuer enough time to actually reach the pre-calculated location of the encounter. In phase 3, the pursuer may set out to move into the pre-calculated location of the encounter and fire the shot when it gets there.

In order to focus on the eye, the predictive autofocusing algorithm may rely on an eye finding algorithm to locate the eye in the image. The eye finding and optical autofocusing algorithms may require test images taken using only ambient light. Moreover, the algorithms may work with frame rates higher than the rate a near infrared, large image size iris camera can support. To overcome certain constraints, the present system may be implemented using a custom-built single-lens-splitter (SLS) camera that uses a beam splitter to separate the NIR and visible light bouncing off the subject and direct it into two separate cameras. The SLS camera is described herein. Other kinds of cameras may instead be used.

In contrast to the autofocusing approaches used in digital photographic cameras, the present system may use genuine image data from a small window around the eye taken in the test images of a sequence, use the image sequence to estimate the position and/or speed of the subject, and feed the data and estimate into a pursuer-evader problem solver to accurately predict the encounter rather then just using simple feedback reacting to a few fast point sensors to catch up with the moving subject. While such simple approaches may work when taking conventional pictures, their performance appears to fall short for iris imaging due to a very short depth of field of the iris camera optics and a need for precise focusing on a small, well defined area of an image.

A combined face and iris recognition system (CFAIRS) may work with high resolution iris images acquired by its iris camera in the near infrared (NIR) spectrum. Other kinds of recognition system may be used. The illumination may be provided by a special NIR flash, whose duration, on the order of one millisecond, may be short enough to freeze the subject's motion during image exposure.

The operational scenario should have a way to focus the iris camera. First, the focusing should be done prior to the flash discharge, using only the ambient light. Second, given the extremely small depth of field of the iris camera optics, the iris camera should be focused not on a vaguely defined "scene", but on the particular eye being photographed.

Of the several phases, in phase 1, the system may acquire data from images to determine the subject's position and/or speed. Speed may include radial speed, which is measured along the optical axis of the camera. However, there may be situations where the subject motion has a high lateral speed (i.e., in a plane perpendicular to the optical axis) as well, in which case the system should determine the complete speed vector.

In phase 2, the position and/or speed may be used to solve a dynamic pursuer-evader problem, a solution of which is the location and/or time of their encounter. Here, the focus lens in the camera objective, whose position determines the focus distance, may be "chasing" the "evading" subject. When they meet, the system needs to recognize this encounter and make the camera fire its shot of the eye or iris of the subject. One may note that as with any evader-pursuer issue, the solution needs to be computed ahead of real time to allow time for the pursuer, whose velocity is always limited, to perhaps actually reach the pre-calculated location of the encounter so as to be prepared for an iris image capture. How long this prediction needs to be, depends on the relative pursuer-evader speed.

In phase 3, the pursuer may set out to move into the pre-calculated location of the encounter. If the pursuer has the ability to update its estimates of the subject's position and/or velocity during the pursuit, the pursuer may counter the subject's "evasive" maneuvers using feedback and improve its odds of obtaining a well focused image of the subject, particularly the subject's iris. The feedback may consist of just a periodic re-run of phases 1 and 2.

The optical autofocusing approaches for moving subjects may differ from other approaches just in their implementation of phase 1. A disadvantage of other approaches may be their inability to precisely locate the focus target. As a tradeoff for precision, a disadvantage of optical approaches may be the relatively long time before they determine the subject's position and/or velocity, which is largely determined by the time needed to collect the test images. The time requirement appears to be of particular concern when the subjects are moving. To speed up the collection, one needs to use a camera with a fast readout. However, fast and large image size sensors (i.e., ten to sixteen Mpixels or so) of the kind needed for iris capture may not be currently available at a reasonable price. To manage the size constraint, the single lens splitter (SLS) camera that uses a beam splitter may support a division-of-labor approach to the issue. The single lens splitter camera is merely an example camera. Two separate cameras may instead be used for visible and infrared image capture, respectively. Or one camera may be used for both visible and infrared image capture.

The SLS camera may have two cameras that share a common high power zoom lens followed by a splitter that separates the incoming light into its NIR and visible components. The NIR component may go straight into the high resolution, but slow, iris camera. The visible component may be deflected and it may enter a fast, low resolution focus camera, whose purpose is to provide data to enable proper and fast autofocusing.

Another limitation may stem from a need to repeatedly change focus in the course of autofocusing. A general and conceptually simplest approach may be the stop-and-go autofocusing in which the system moves the focus lens, waits until it stops, then starts the image exposure and waits until the exposure is over before it begins to move the lens again to acquire the next image. This is an approach which may involve moving mechanical parts with inertia. Thus, getting the parts moving and stopping them may be slowed down by dynamic transients. A continuous focus sweep autofocusing may improve the speed and reduce mechanical stresses on the optics by not requiring the focus lens to stop and start during each test image acquisition cycle.

The SLS camera's apparent complexity or other camera's properties might not be a consequence of using the particular autofocusing approaches presented herein. An issue may be that, given the sensor technology limitations, generally an iris camera cannot focus by itself. Regardless of what autofocusing approach one uses, the solution may require an auxiliary, be it another camera, lidar or some other device, whose presence could complicate the design, and whose role is to find the focus target in the scene, i.e., the particular eye that the iris camera will photograph, and autofocus on it using an approach of choice. Thus, a target that moves radially (and possibly also laterally) might be handled only by predictive autofocusing approaches. One reason for predictive autofocusing is that due to the limited focus lens velocity the lens focus ($d_F(t)$), the lens focus can be changed only so fast.

FIG. 1 is a diagram of the present predictive autofocusing system 10 having a camera system 22 and a processor 30. The diagram shows a basic relationship between a subject 21 and camera 22 in view of distance 11 of the subject's eye from the camera and focus distance 12. Focus distance 12 may reveal the momentary distance of camera 22 to some place along a range 23 where subject 21, particularly the subject's eye 27, would be in focus. The rear end is the farthest and the near end of range 23 is the closest to camera 22. The image collection may nearly always start at the rear end but may be terminated before reaching the near end of range 23. The place, point or location along range 23 may move with focus change. The place, where the focus distance and subject distance coincide, may be regarded as an encounter 15. Also, there may be a light source 28 for illuminating subject 21 during an iris image capture.

Figure 2:
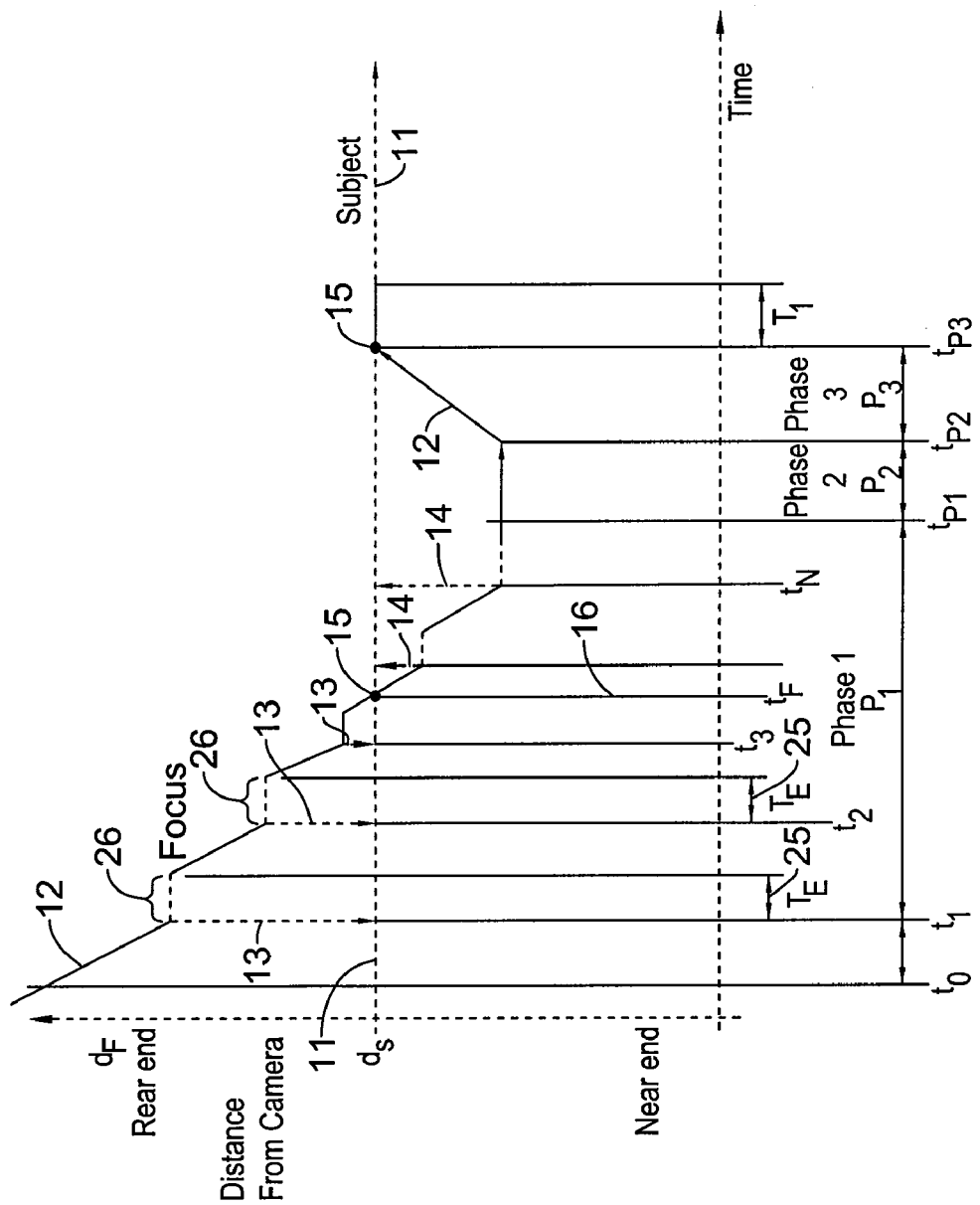
FIG. 2 is a graph that illustrates a sequence of actions that makes up a stop-and-go autofocusing cycle.

FIG. 2 illustrates a sequence of actions that makes up a stop-and-go autofocusing cycle. The Figure is a graph of distance (whether focus or subject) from camera 22 versus time. One may initially assume that subject 21 is standing still at the distance 11 ($d_S$) from camera 22. Focus distance 12 ($d_F$) from the camera is shown having moments of movement when not parallel to the time coordinate. The Figure shows the stop-and-go autofocusing cycle when the subject is standing still. The vertical dashed arrows 13, 14 show the focus distance 12 errors at different instants $t_1$, $t_2$, $t_3$, $t_F$ and $t_N$. Points 15 are where the focusing distance 12 coincides with subject distance 11. These may be regarded as encounters.

Camera 22 and CFAIRS system 22 may be terms which may be used at times interchangeably in the present description. At time $t_0$, system 22 may lock onto the subject 21 and initiate an iris image capture approach. The system's ranging subsystem may obtain a reading on the subject's approximate distance, which can be used to preset the focus lens at a location, position or distance 12 $d_F$ where the subject 21 would be in focus if the subject were standing that far or at that distance from the camera. Because the subject's actual distance 11 is $d_S$, the focus lens setting may appear to be off by $(d_S - d_F)$ meters. One may assume that the initial difference 12 $d_F$ is virtually identical with an end point of the range 23 and is beyond the subject (i.e., $d_S < d_F$, farther away from camera 22 than the subject 21 is), and that at time $t_1$ the focus lens will have already arrived at this point.

A focus camera of camera 22 may start the autofocusing cycle at time $t_1$ by taking its first image. The exposure time 25 may be for the first image taking be designated a $T_E$. The focus during that time $T_E$ may be designated as a focus period 26, whether the focus distance 12 is changing or not, and be a dashed line portion of focus distance 12 graph. As soon as the exposure ends at $t_1 + T_E$, the system may once again start moving the focus lens and thus changing the focus distance 12. After it stops at time $t_2$, the focus camera may take a second test image during $T_E$ 25 and during the focus holding distance 26, and so on. According to FIG. 2, a total of five images (N=5) images may be taken. One may note that at time 16 ($t_F$), the focus lens may have passed through a correct focus position 15 (marked by a dot), but at this time, the camera is not necessarily aware of the correct focus position. What may be significant is that the focus of the lens did pass through that position 15. It is the next encounter 15 which may be useful for an iris image capture. Once the first image becomes available at $t_1 + T_E$, the autofocusing algorithm may start to look for the eye at which to focus. While knowing that the eye location, which may be regarded as being at position 15, is not necessarily needed for the focus lens stepping, which proceeds at pre-set time intervals of the length $T_L$, the eye location may be needed for determining that the focus lens distance 12 position or point 23 has passed through the correct focus point or position 15. For that, the autofocusing algorithm should compute the image intensity variance around the eye 27 in a few images before and after it reaches the focus point. Of the images, only a few images would be acquired after the correct focus point 15 is reached.

The number of images taken, N, may depend on the subject speed, which is not known at this point in time. The faster the subject 21 moves, then the more test images the focus camera needs to take since it takes the focus lens longer to catch up at time 16 $t_F$ with the moving subject 21. In order to determine the image sequence length dynamically, the system 10 would need to process the test images in real time. This means that the time the system has at most is $T_L$ seconds from when the current image exposure terminates until the next image data becomes available to locate the eye 27, to extract data from a window 29 surrounding the eye, to calculate the image intensity variance over the window data and to decide whether to terminate the test sequence acquisition. Upon the capturing of a test image, virtually immediately in real time, the intensity variance over the target window 29 may be calculated before capturing the next image. Completing the test image sequence at time $t_{P_1}$ may conclude phase 1.

The system may next enter phase 2, when it uses the data to find the time 16 $t_F$ of the system's passing through the correct focus point 15, to compute the estimate of the subject's radial speed, $v_S$, (i.e., down the iris camera's optical axis) to compute the estimate of the subject's location, $d_S(t_F)$, at which the focus occurred, to compute the prediction of the time $t_P$ at which to take the iris image, and to decide whether to actively move the focus lens into a new position to speed up the process or wait until the moving subject 21 passes through the second point 15 of focus.

When done computing the encounter specifics, which happens at time $t_{P_2}$, the system may begin phase 3 to implement a pursuit strategy. The encounter may take place at time $t_{P_3}$, when the iris camera of camera 22, or another camera, fires its flash and takes an iris picture.

The next step may be to extend the concept to moving subjects. However, one may skip this extension and move on to the continuous focus sweep autofocusing since the basic ideas appear the same. A forward sweep approach may be considered.

Figure 3:
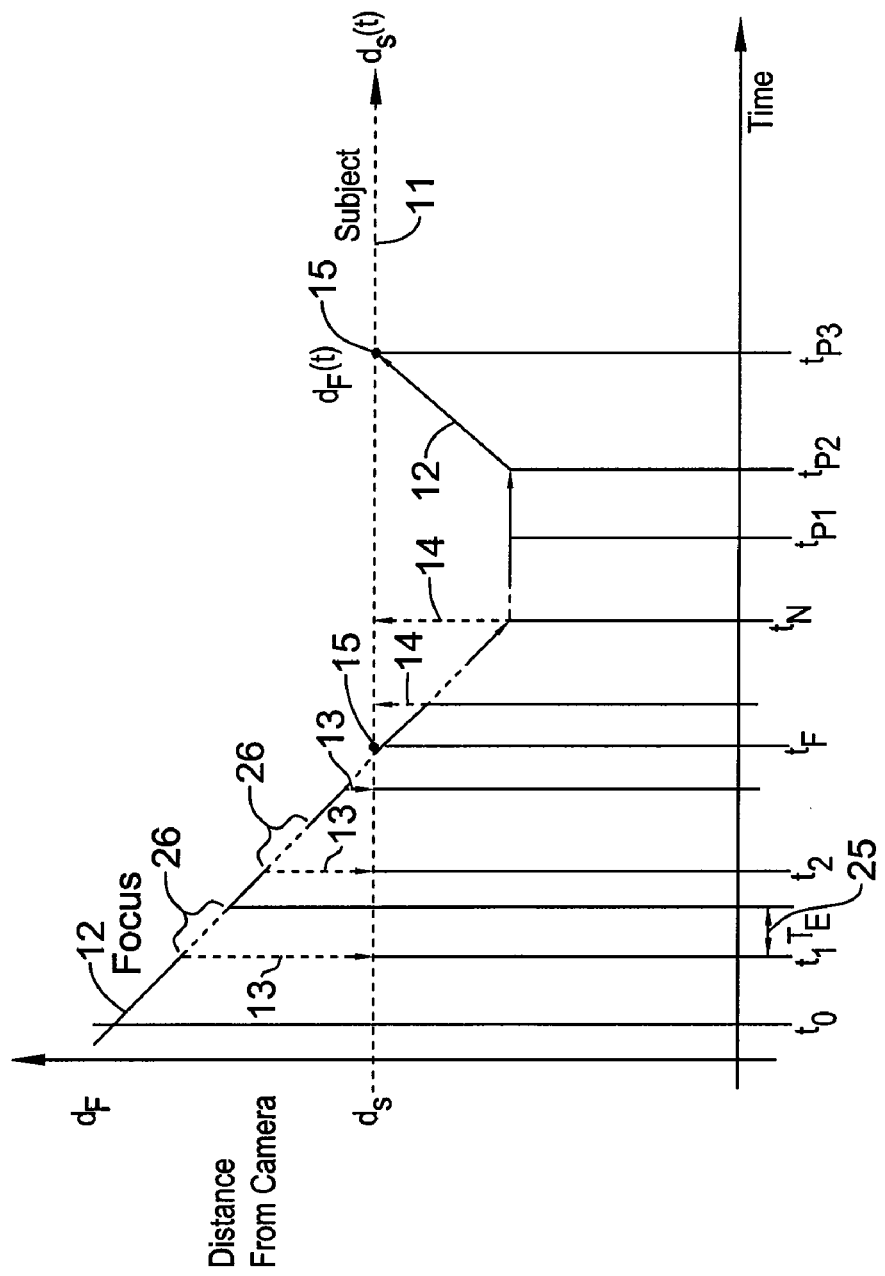
FIG. 3 is a graph that shows a continuous focus sweep version of the stop-and-go approach in FIG. 2.

Dynamic transients associated with the repeated moving and stopping of the focus lens tend to slow down the image acquisition process, mechanically stress the lens drive and increase power consumption. A better solution may be not to stop the lens movement but to expose pictures while the lens is moving. An added benefit of this approach is that the exposure and move intervals overlap so that the lens is already closer to its new position 23 when the exposure ends and thus the lens gets there sooner. FIG. 3 shows a continuous focus sweep version of the stop-and-go approach in FIG. 2. Since the focus sweeps (distance $d_F$) forward here, i.e., to a point of range 23 nearer the camera 22, this version may be referred to as the forward sweep design. FIG. 3 shows the continuous focus sweep autofocusing cycle when the subject 21 is standing still, that is, $d_S$ is not changing. The focus distance 12 may continue to change at the focus distance portion 26 during time 25 $T_E$. This should not necessarily have an adverse effect on image capture.

Figure 4:
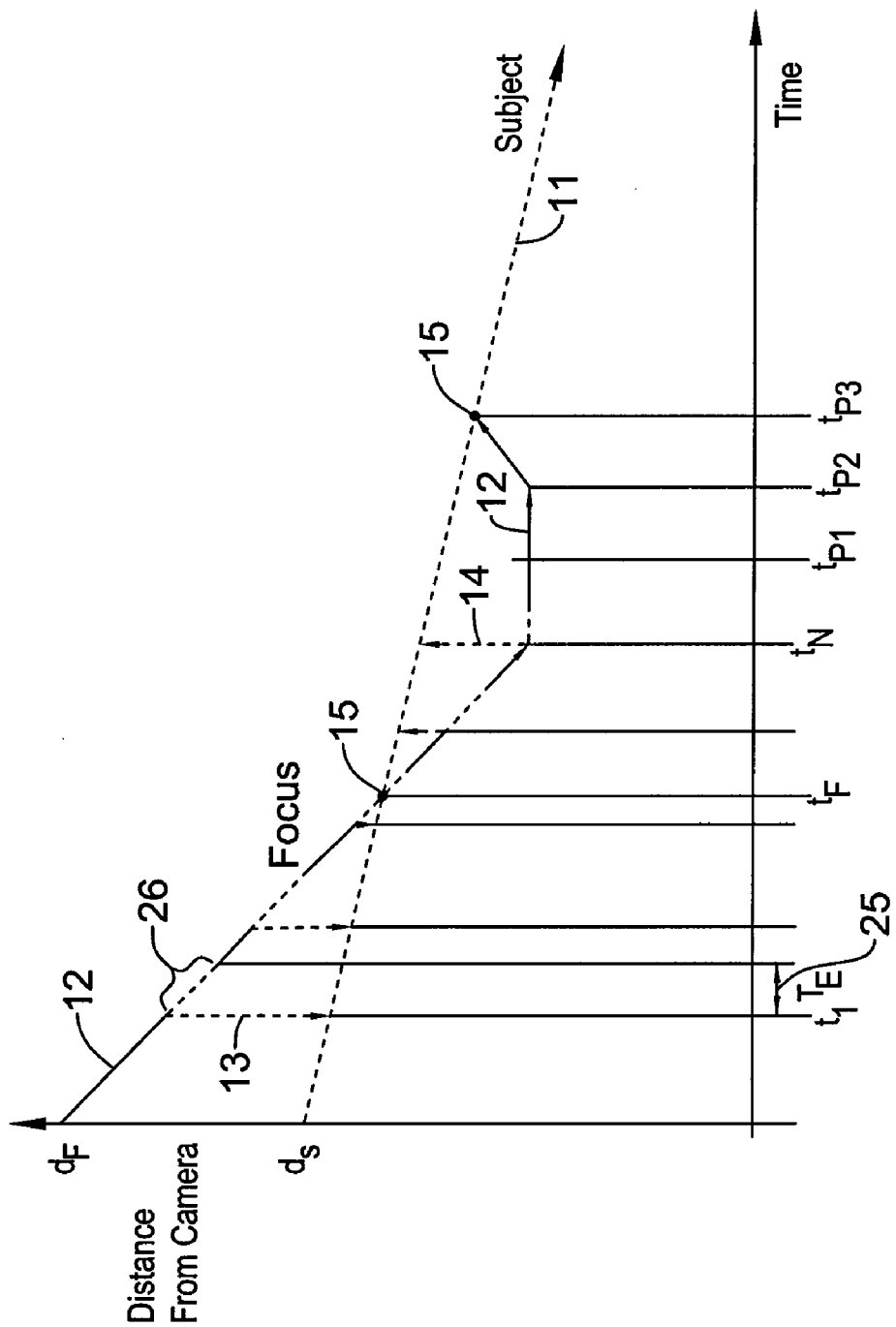
FIG. 4 is a graph that shows the continuous focus sweep autofocusing cycle when a subject is approaching a camera.

In FIG. 4, shows the subject 21 approaching camera 22 at the constant speed $v_S$, whose value is reflected in a slope of line 11, each point of which indicates the subject's distance 11 from camera 22. The rate of error change may depend not only on the focus lens, but also on how fast is the subject 21 moving (e.g., walking). One may note that because both the subject 21 and focus point 15 appear moving toward camera 22 thus making the distance shorter, their velocities may be negative. FIG. 4 shows the continuous focus sweep autofocusing cycle when the subject 21 is approaching camera 22. The focus error 13, 14 may change its sign at the time $t_F$. Focus error may go from being designated as error 13 to being designated as error 14 as focus distance or line 12 crosses the first point 15 while moving from left to right in FIGS. 2-4. Focus error 13 or 14 may be a difference between subject distance 11 and focus distance 12.

As the Figures show, the lens focus may be in error by being incorrectly set either before or beyond the subject 21. The focus or focusing error e(t) at time t may be introduced as the difference between the subject distance $d_S(t)$ and the focus distance $d_F(t)$, $$e(t) = d_S(t) - d_F(t). \quad (1)$$

The focusing error at the start of the autofocusing cycle in the forward sweep design, $$e(t_1) = d_S(t_1) - d_F(t_1) < 0, \quad (2)$$

may be negative, but change its sign later at time $t_F$. Assuming that both the subject and lens focus are moving at constant velocities $v_S$ and $v_F$, respectively, they may advance in time $\Delta t$ to new positions, $$d_S(t+\Delta t) = d_S(t) + v_S \Delta t, \text{ and } d_F(t+\Delta t) = d_F(t) + v_F \Delta t, \quad (3)$$

thus changing the focusing error to a new value, $$e(t+\Delta t) = e(t) + (v_S - v_F)\Delta t. \quad (4)$$

A significant requirement for the continuous focus sweep to work is that the focus lens may move only so fast in that the focusing error change during the exposure is smaller than the depth of field of the camera objective. If the focus camera exposure lasts $T_E$ seconds, then the following inequality must hold.

$$|v_S - v_F|T_E \leq \text{depth of field for all } n=1, 2, \ldots \quad (5)$$

for the continuous forward focus sweep to work. Also, if the lens focus point is to ever get ahead of the subject, the velocities need to satisfy the inequality, $$v_F < v_S \leq 0 \quad (6)$$

Figure 5:
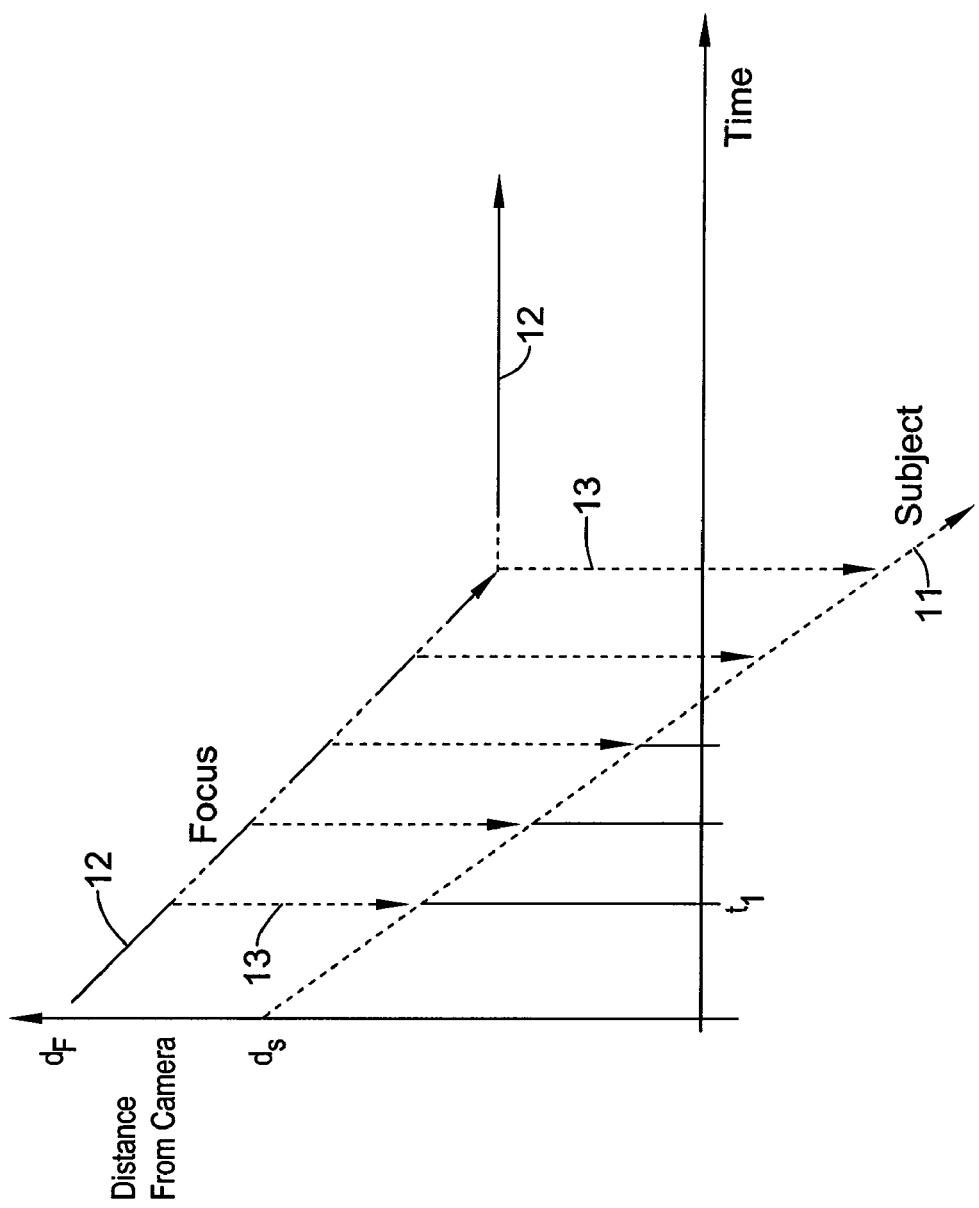
FIG. 5 is a graph that shows the continuous focus sweep autofocusing cycle where the subject appears to be moving too fast and a lens focus distance thus does not get ahead of the subject distance resulting in an error.

It may happen that the subject 21 is moving so fast that the focus lens drive lacks the power to get the lens focus position 23 ahead of the subject and the inequality (6) is not met. In reality, the autofocus may likely "time out" sooner, even though getting lens focus ahead of the subject is still theoretically possible, since getting ahead would likely take too much time to achieve. FIG. 5 shows the continuous focus sweep autofocusing cycle where the subject 21 appears to be or actually is moving too fast and the lens focus distance 12 thus does not get ahead of the subject 21 distance 11, and error 13 increases.

Figure 6:
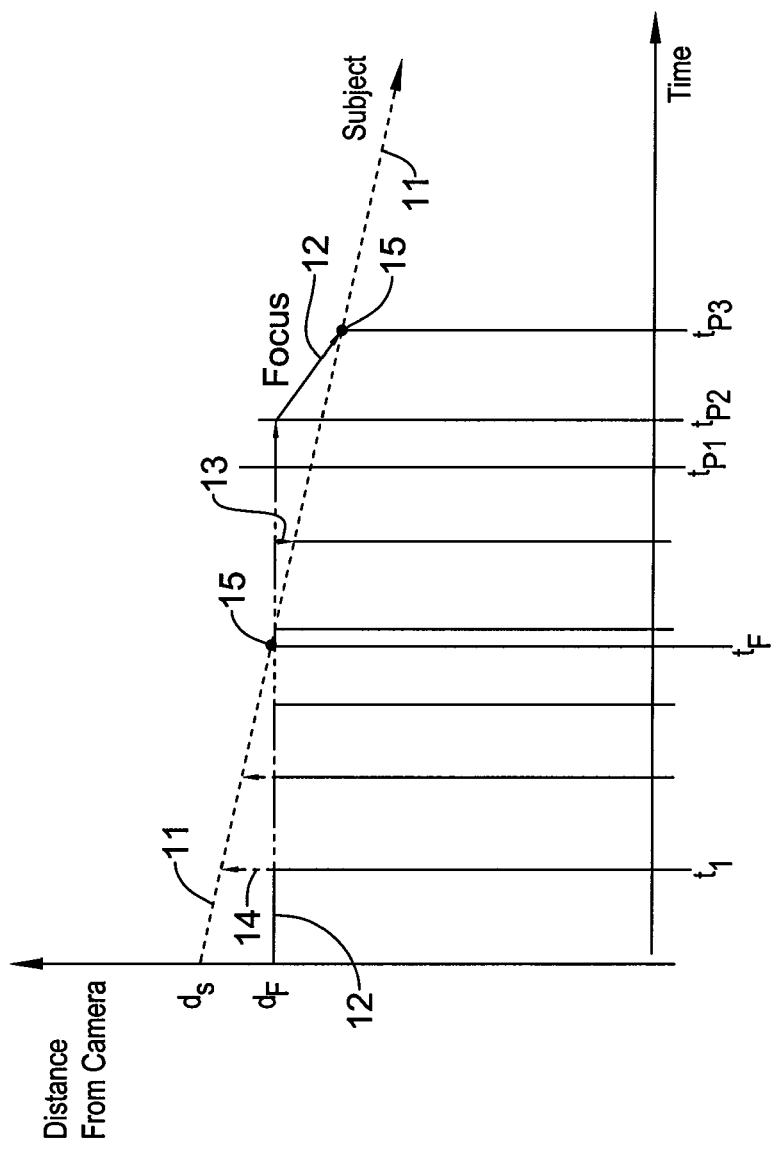
FIG. 6 is a graph showing a subject that sweeps through a focus range or distance through its movement.

The roles of the lens of camera 22 and the subject 21 may be swapped. FIG. 4 may show an example way to take advantage of the subject's motion. Here, the focus lens distance 12 of camera 22 could sit still at some time after the first encounter 15, sparing the optics both the dynamic shocks and time consuming transients. However, even though this approach may work for a moving subject 21, it would not necessarily work for a stationary subject 21 and thus not be acceptable. FIG. 6 shows letting the subject 21 sweep the focus range or distance through its movement.

The backward sweep approach may start from an initial position where the focus lens distance 12 is preset so as to be before the subject 21 (i.e., closer to camera 22 than subject 21), $$e(t_1) = d_S(t_1) - d_F(t_1) > 0. \quad (7)$$

The focus velocity may now need to head away from the camera, $$v_F \geq 0, \quad (8)$$

for the approach to work. While possible, the backward sweep approach may be slower than the forward sweep approach. A reason may be that even if the image sequence is shorter, when the time $t_{P_2}$ comes to move the focus lens, the lens finds itself much farther from the desired location, because the lens traveled away from the location during the sequence capture.

Figure 7:
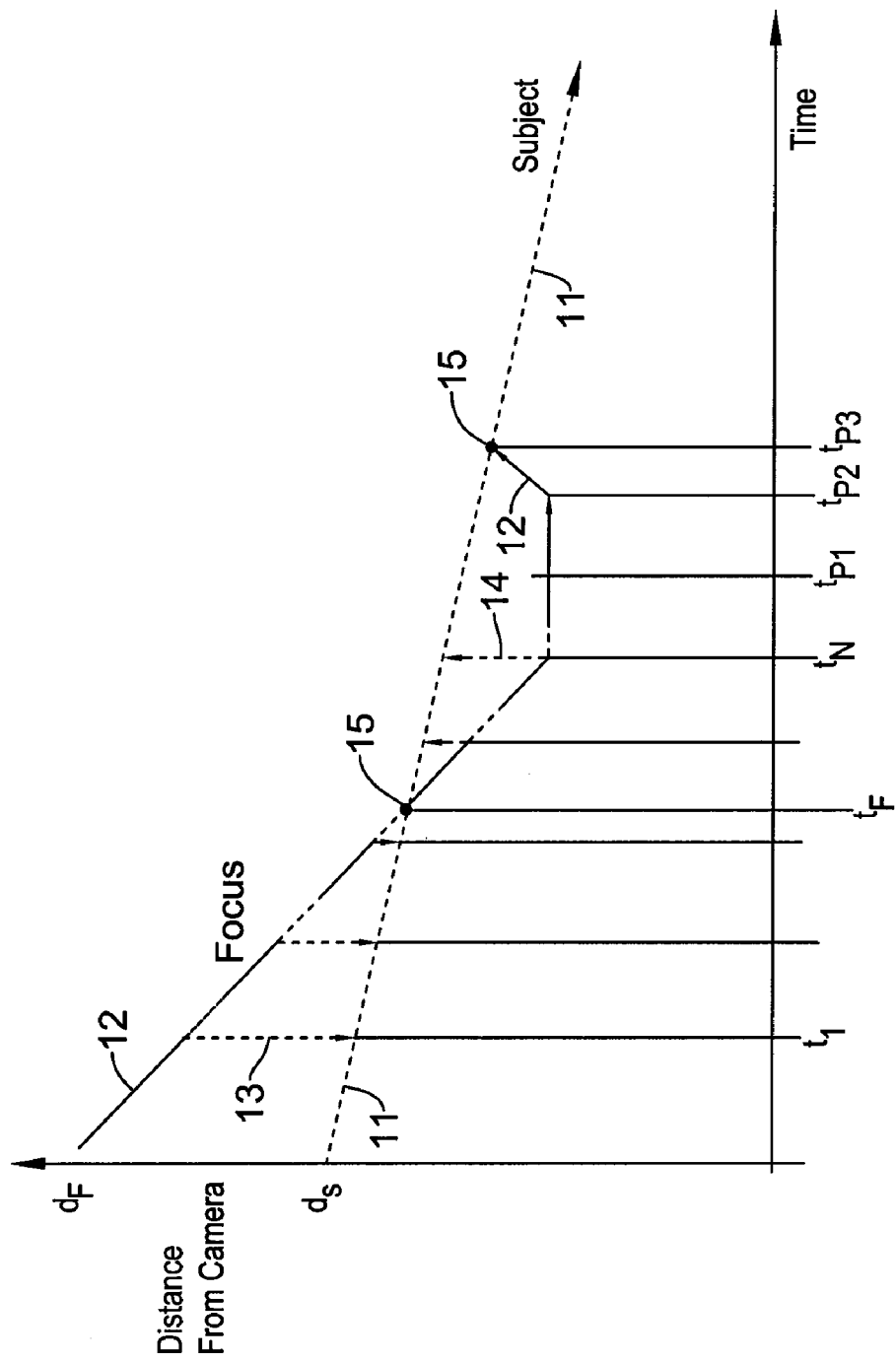
FIGS. 7 and 8 are graphs showing forward and backward focus sweeps, respectively, of the focus and subject distances from a camera.
Figure 8:
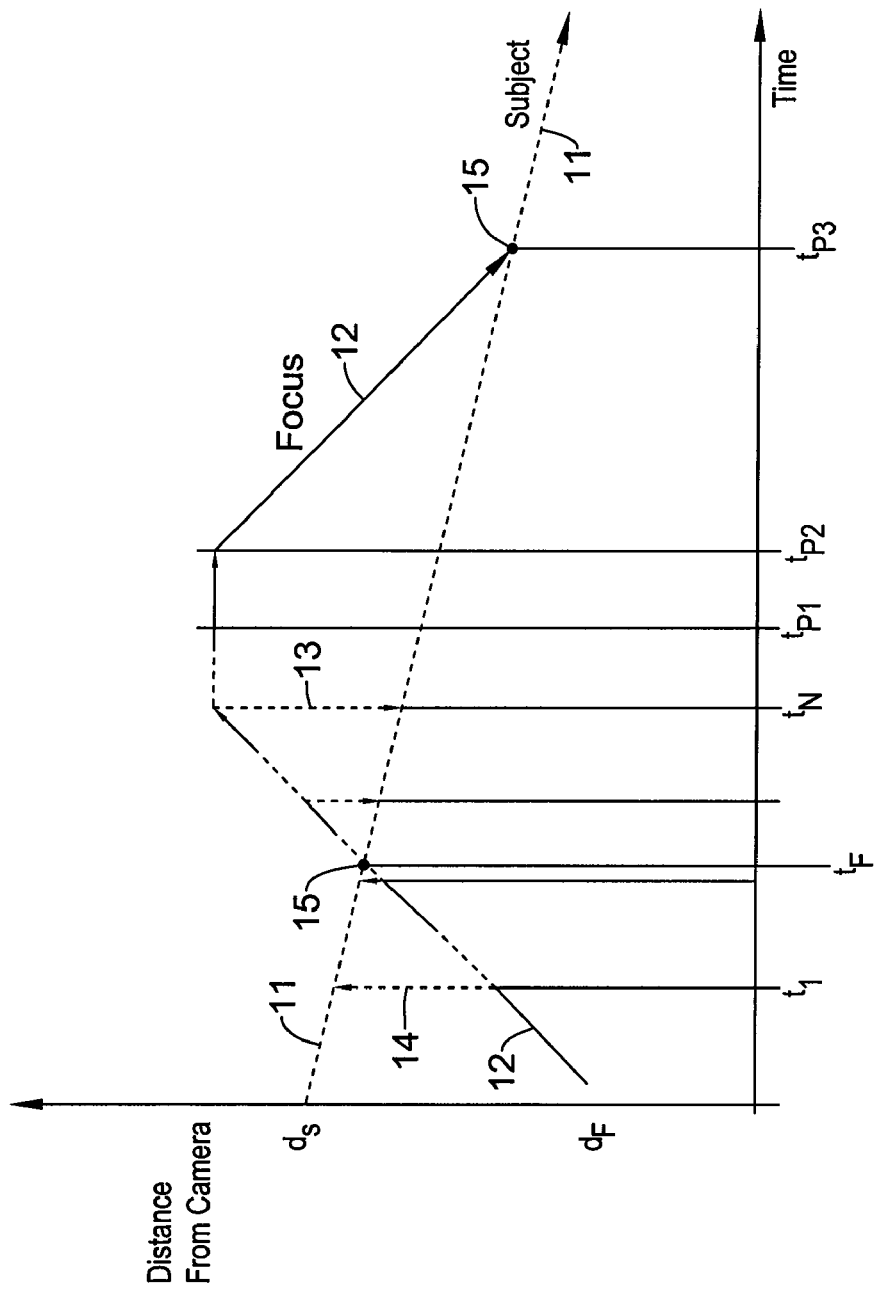

The timings in the forward and backward focus sweep approaches are shown in FIGS. 7 and 8, respectively. The Figures have diagrams which are intentionally drawn so that both approaches have a minimum possible number of two images past the first focus point. Such a comparison of ideal cases, however, might not always be valid. For instance, if the focus images are badly underexposed, which could easily happen whenever the CFAIRS system is working in a poorly lit environment, the forward sweep design may have to take more than just two images past the first focus point. A more appropriate comparison then might need obtaining enough data to achieve a comparable signal-to-noise ratio rather than having the same number of images. This may roughly imply comparable focusing errors $e(t_N)$ and, consequently, a need to take more images past the first focus point. It may be noted that the initial focus distance error appears about the same in both diagrams of FIGS. 7 and 8.

Figure 9:
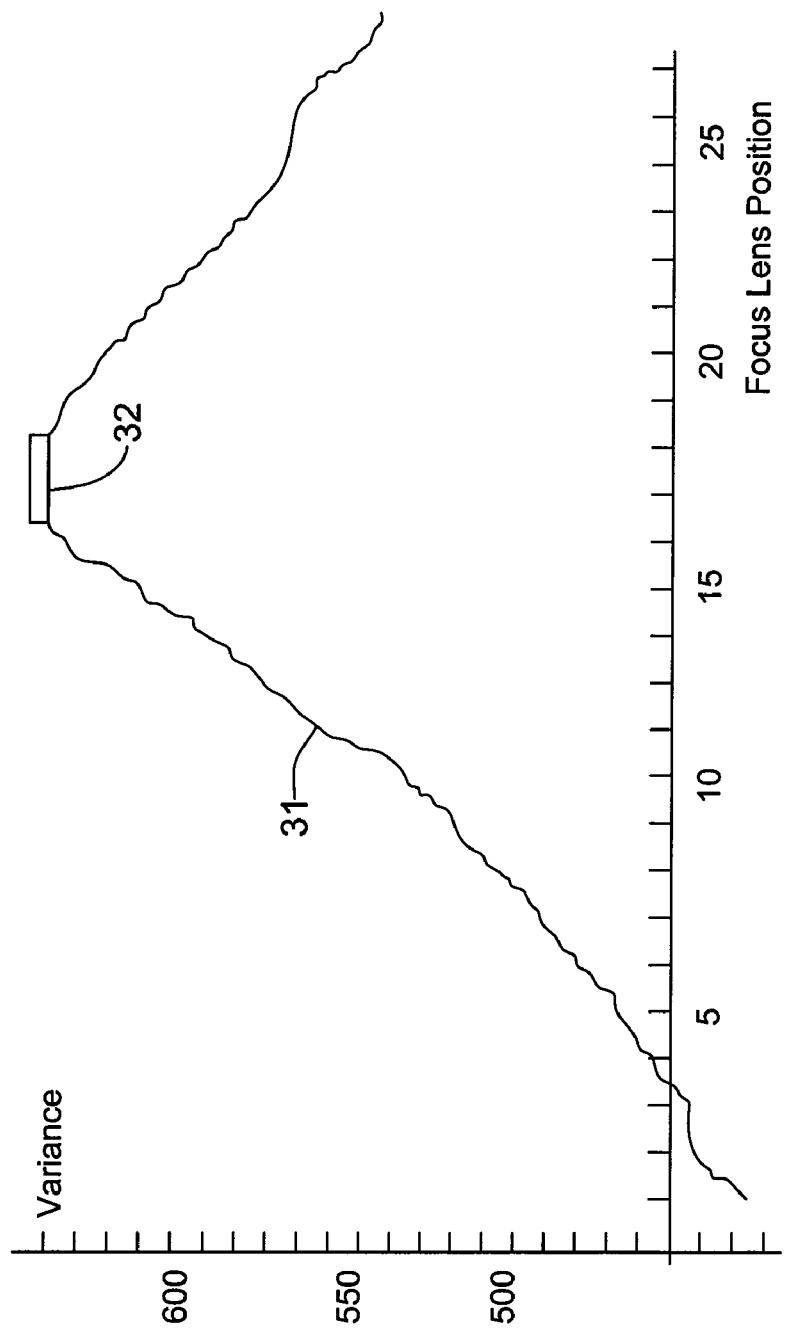
FIG. 9 is a plot of image intensity variance as the function of a changing focus lens position.
Figure 16:
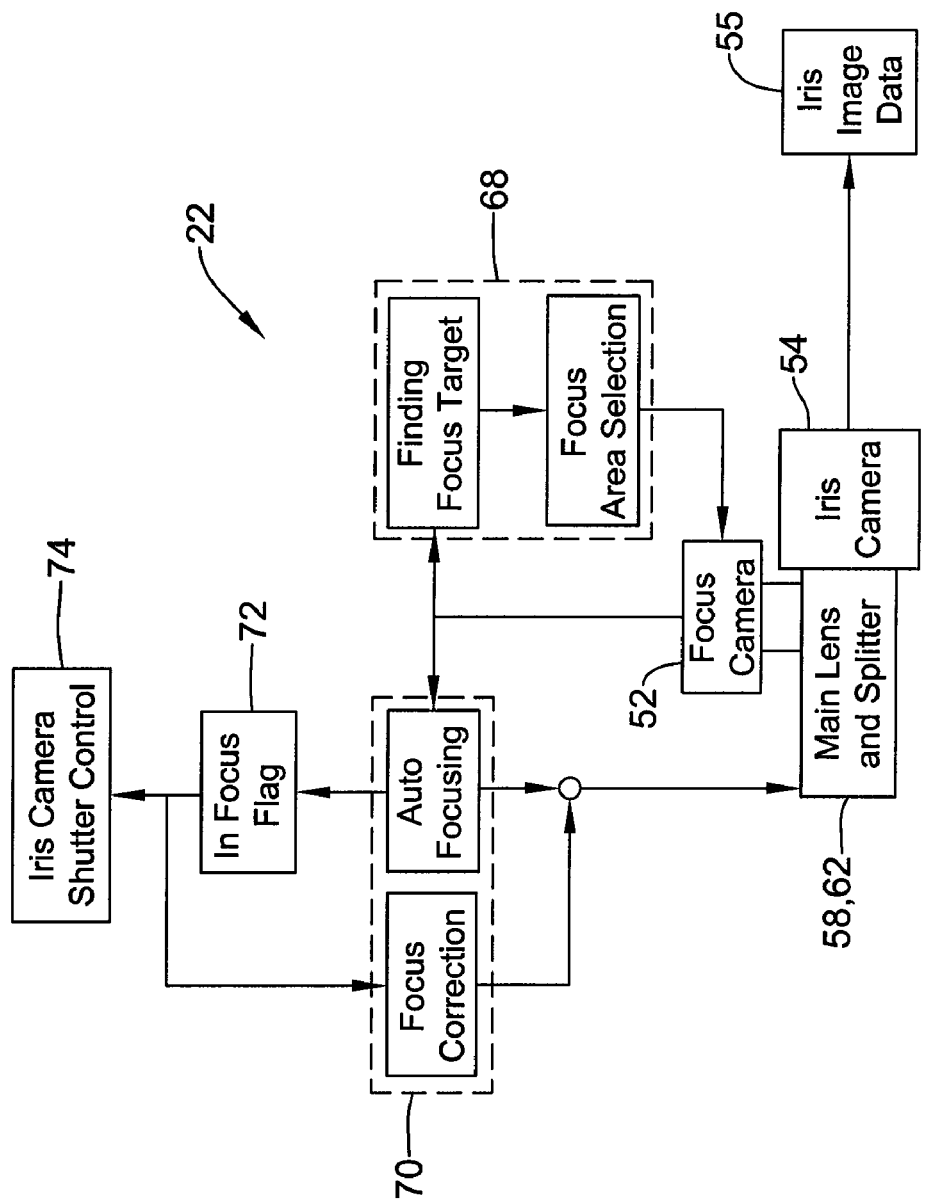
FIG. 16 is a schematic illustration of how particular elements of the camera system of FIG. 15 support an iris camera.

Focus quality may be measured by the image intensity variance computed over a window (patch) 29 of an area centered on eye 27 (FIG. 1) which is the focus target in FIG. 16. Note that due to lateral motion, the focus target may shift from one test image to another, and thus should be determined for each test image. The larger is the variance, the higher is the image contrast, and the closer to focus is the image. FIG. 9 is a plot 31 of image intensity variance as the function of a changing focus lens position. The plot may be measured in an iris image over a small area around one eye and may use the same kind of data that the autofocusing algorithm extracts from its sequence of focus camera images as described herein except that the focus sweep shown in the plot appears much wider. The five images shown in other illustrations noted herein would appear to cover a rather narrow region around a peak 32. One may note that the peak 32 is not sharp but has a flat top, which is highlighted in with a rectangle in the Figure. The presence of the flat top or plateau 32 is a consequence of the lens' depth of field and the plateau's width being proportional to the depth of field. The larger the depth of field, the wider is the plateau 32. Setting the lens' focus somewhere near the plateau center may be considered good focusing. Since the depth of field of an SLS camera 22 objective may be about 25 mm, the plateau 32 seems fairly narrow.

Plot 31 shown in FIG. 9 was made from a sequence of well exposed images and thus appears to have steep, clean slopes. Also, the variance was measured on the same set of pixels in each image. In the real world of moving subjects, however, the images should have a short exposure, yet cannot be taken with a flash. Consequently, the images may often appear underexposed and thus grainy. Further, the resulting low dynamic range may lower the hill (i.e., plot 31) and make it flatter while, at the same time, the noise will make its slopes jagged. Moreover, the eyes 27 of a moving subject 21 may shift from image to image, preventing a use of the same set of pixels for calculating the variance and, in effect, introducing another random noise into the data. The smaller the area, the stronger will be this noise. This combination of adverse effects may complicate the task of finding the hill's peak 32. Theoretically, getting two points on either slope, i.e., four images, would suffice to locate the peak 32. In the real world circumstances, getting a robust solution in the presence of noise may require a few more images. How many more images would be needed may be primarily dictated by the noise levels and a desired degree of certainty.

Once the test images are collected at $t_{P_1}$, estimating the subject's speed may be performed. The variance change illustrated in FIG. 9 may be related to the timing diagrams from the other Figures herein. For that purpose, FIG. 9 may be redrawn so as to make the variance a function of the focusing error. However, the error really is not an independent variable, but varies in time during the sequence. To illustrate this fact, the plot sketched in FIG. 10 has two abscissas 33 and 34, one for the focusing error and another for time, respectively. Also, unlike for the measurement plotted in FIG. 9, one knows the variance values only at discrete times t, at which the focus camera images were taken. They may start at $t_1$ and be $T_L$ seconds apart, $$t_n = t_1 + (n-1)T_L \text{ for } n=1, 2, \ldots N. \quad (9)$$

In system 10, the sampling period $T_L$ may be fixed.

Figure 10:
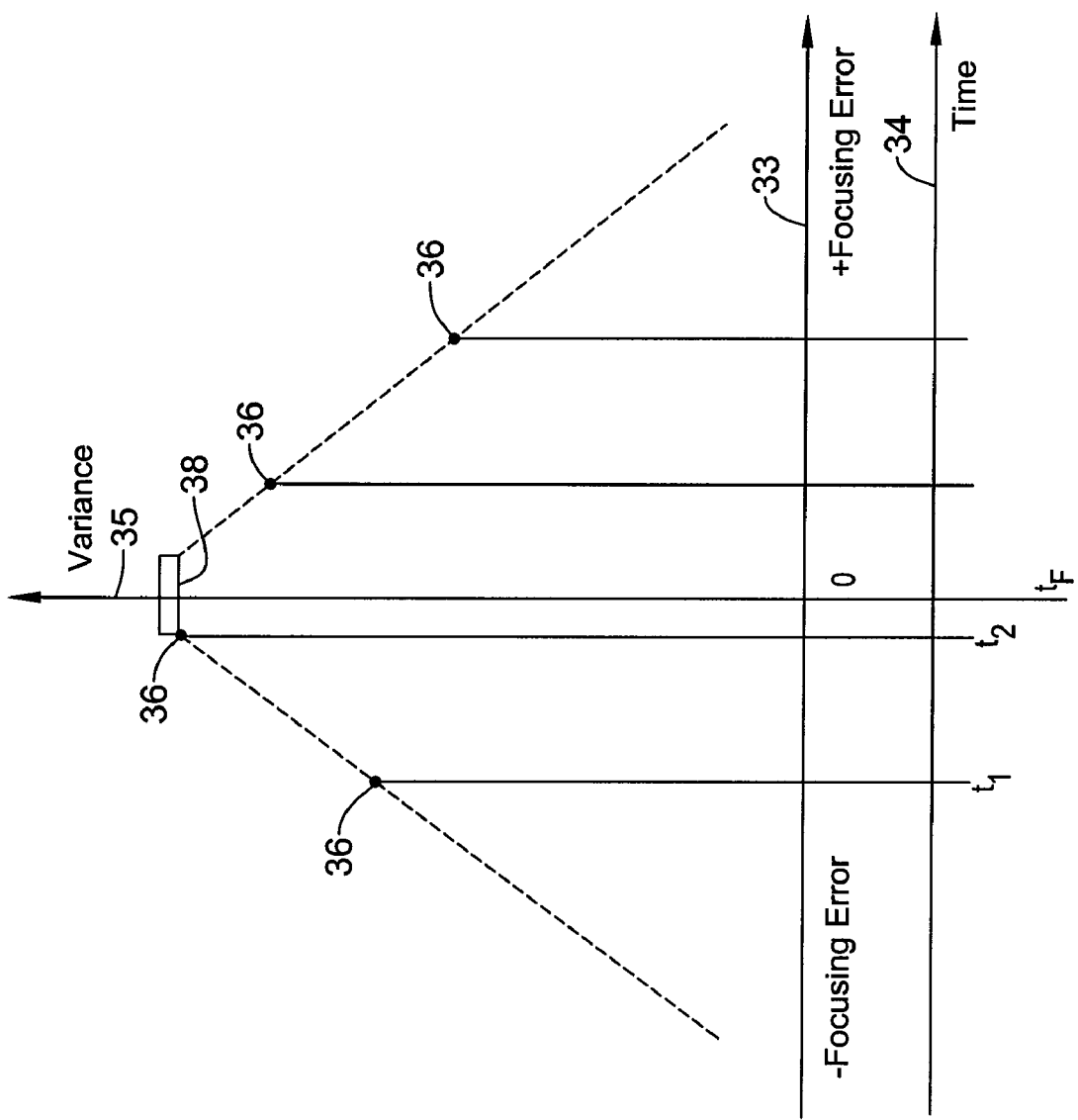
FIG. 10 is a graph showing image intensity variance samples for a standing subject relative to focusing error and time.

FIG. 10 shows image intensity variance 35 samples 36 for a standing subject 21. The focusing error scale 33 may be measured in terms of the focus lens position set point values and thus be regarded as absolute.

Once subject 21 is allowed to move, in the illustrations it may be noted that the relationship between the focusing error and time depends on the combined velocity $(v_S - v_F)$ as the equation (4) states. The error measured at the sampling instants may be $$e(t_n)=e(t_1)+(v_S-v_F)(n-1)T_L \text{ for } n=1,2,\ldots, \quad (10)$$

with $e(t_1)<0$ being the forward sweep design assumption (2). The inequality (6) may be rewritten as $$0<v_S-v_F\leq v_F, \quad (11)$$

from which the largest focus error increments, $-v_F T_L$, may occur when the subject 21 is standing, i.e., the subject's velocity $v_S=0$. Or in other words, the faster that the subject 21 is moving, the smaller the increments, which may be manifested on the time axis 34 by shortening its scale as if the samples were denser in time. A flat top 38 like top 32 of FIG. 9 may be noted.

Figure 11:
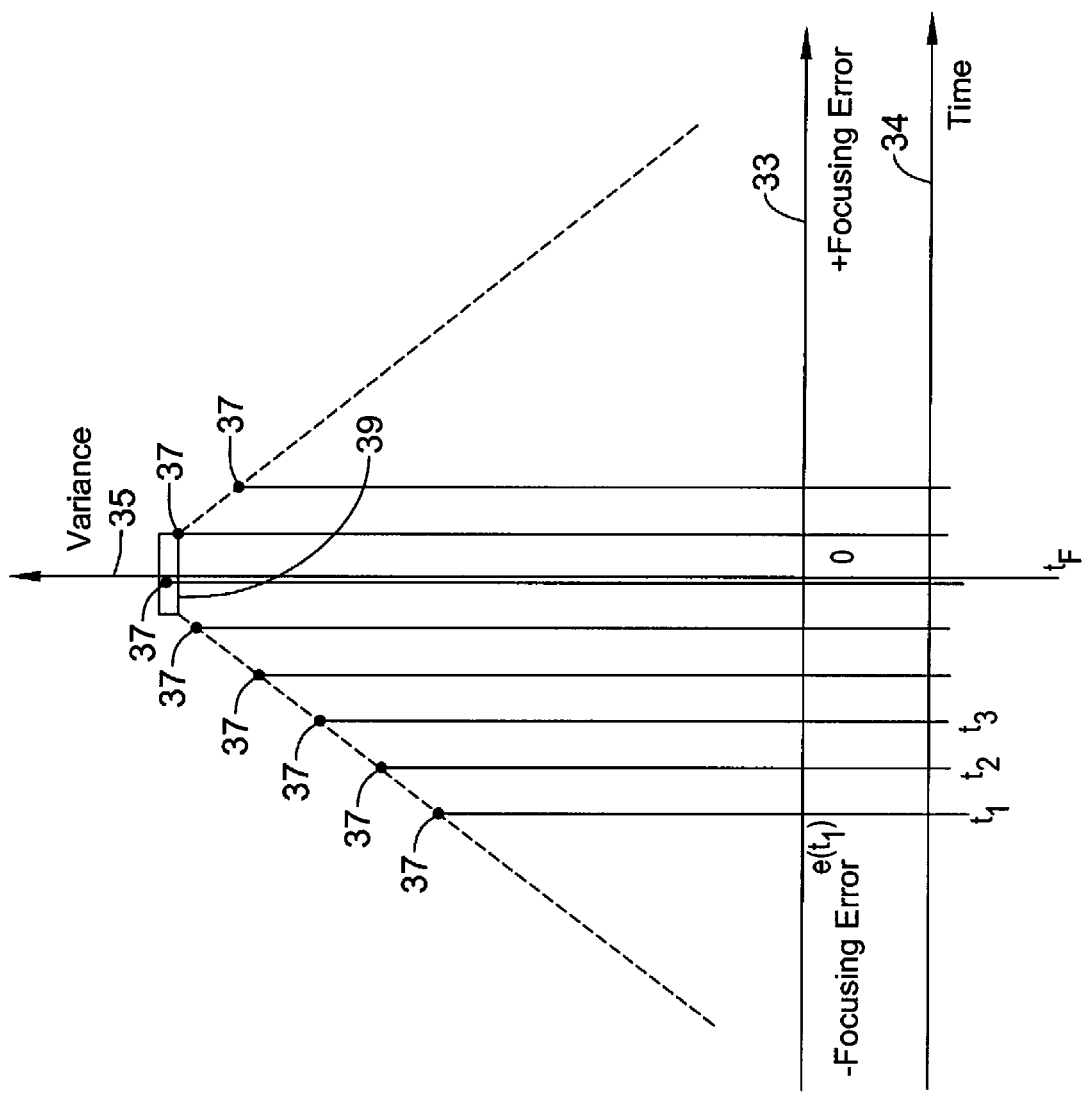
FIG. 11 is a graph showing image intensity variance samples for a moving subject relative to focusing error and time.

FIG. 11 shows image intensity variance samples 37 for a moving subject 21. A flat top 39 like top 32 may be noted. Holding onto the absolute focus error scale 33 may cause the time axis 34 to change its scale. Starting from the same initial focus error $e(t_1)$, the focus camera may take a number of images before the focus catches up with subject 21 at time $t_F$ and eventually gets ahead of subject 21 as illustrated in FIG. 11. If subject's speed increases further, there comes the limit when $v_S-v_F=0$ and the focus will keep "threading water" at its initial position as the sampling becomes infinitely dense.

$$e(t_n)=e(t_1) \text{ for } n=1,2,\ldots \quad (12)$$

Increasing the subject's velocity even further may produce a growing error $e(t_n)>e(t_1)$. This phenomenon may correspond to the case shown in FIG. 5. Crossing this limit may cause the samples 37 to actually move away from the correct focus.

Figure 12:
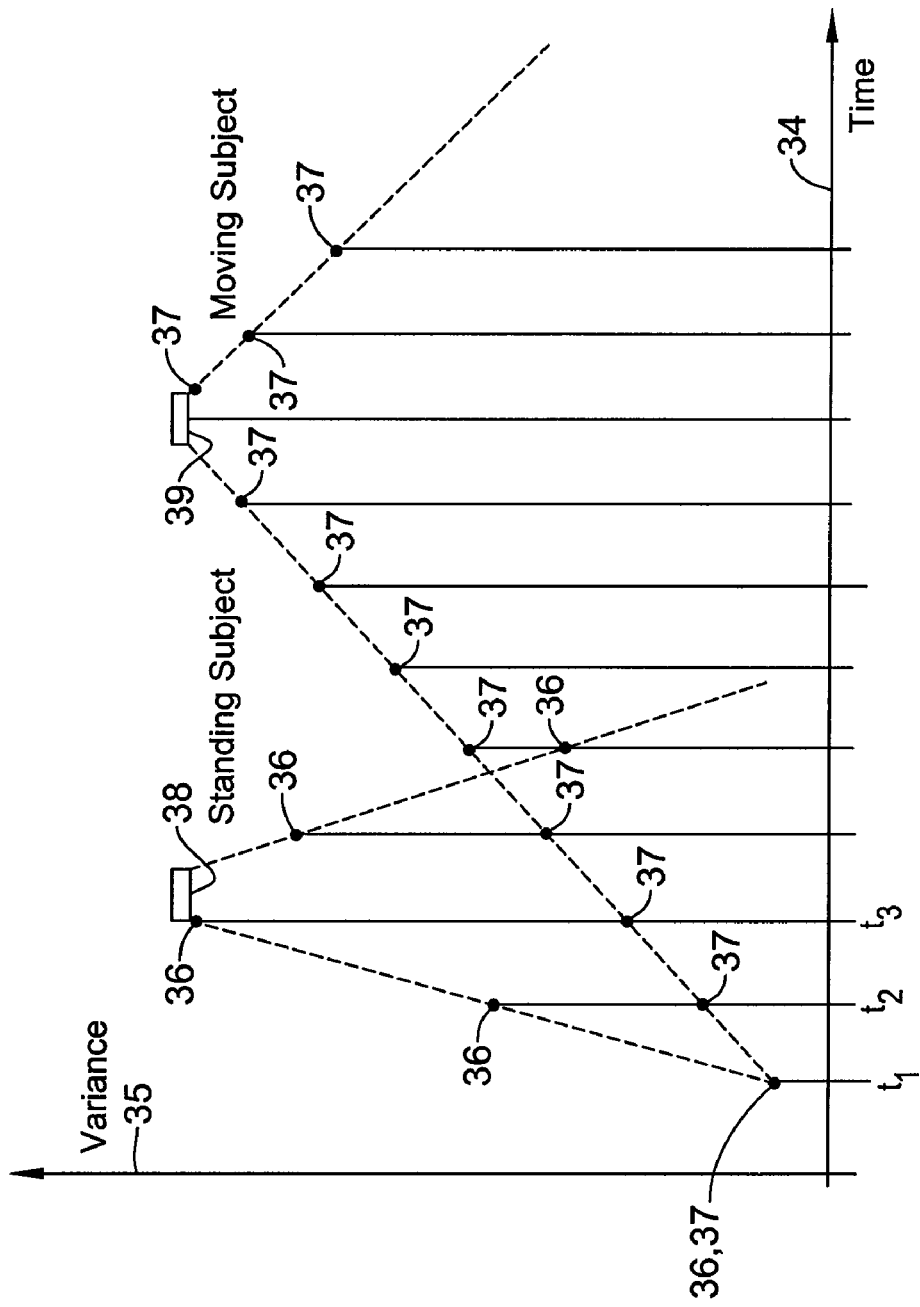
FIG. 12 is a graph combining the graphs of FIGS. 10 and 11.

Using the focus error scale 33 as the independent variable may make the time axis scale 34 vary as appearing in FIGS. 10 and 11. However, one may choose an opposite approach as well, namely, to take the time scale 34 as the independent variable in the plots and accept that it will be the focus error scale 33 now which is going to be variable as a function of the subject 21 velocity. FIGS. 10 and 11 may then be combined into one and redrawn as shown in FIG. 12. This Figure shows image intensity variance samples 36, 37 taken from standing and moving subjects 21. Because the time scale 34 is now fixed, the focus error scale 33 may vary with the subject 21 speed.

Figure 13:
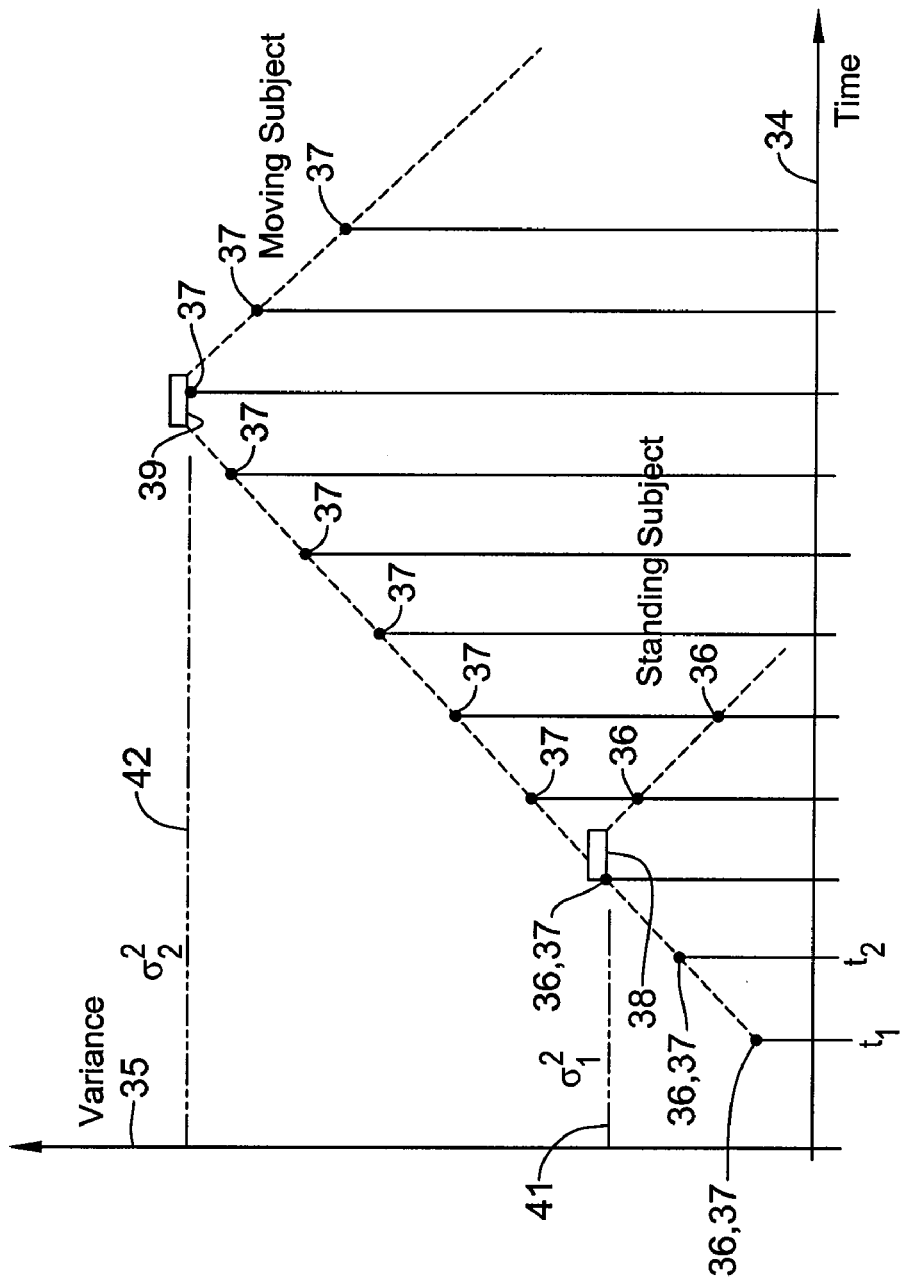
FIG. 13 is a graph showing that two subjects moving at different speeds may have the same rates of variance change, if their peak variances differ.

FIG. 13 shows that two subjects 21 moving at different speeds may have virtually identical rates of variance 35 change, if their peak variances differ. This Figure may give rise to several items. First, the variance may depend on the image data within the window over which it is computed. There might be a situation in which the variance 41 ($\sigma_1^2$) belonging to a standing subject 21 happens to be smaller than the variance 42 ($\sigma_2^2$) measured on another subject 21, who is moving. As FIG. 13 shows, the rates of variance change in both cases may be the same because of different variance values, obscuring the speed differences. Thus, estimating the subject 21 speed should be carried from normalized variance data.

Figure 14:
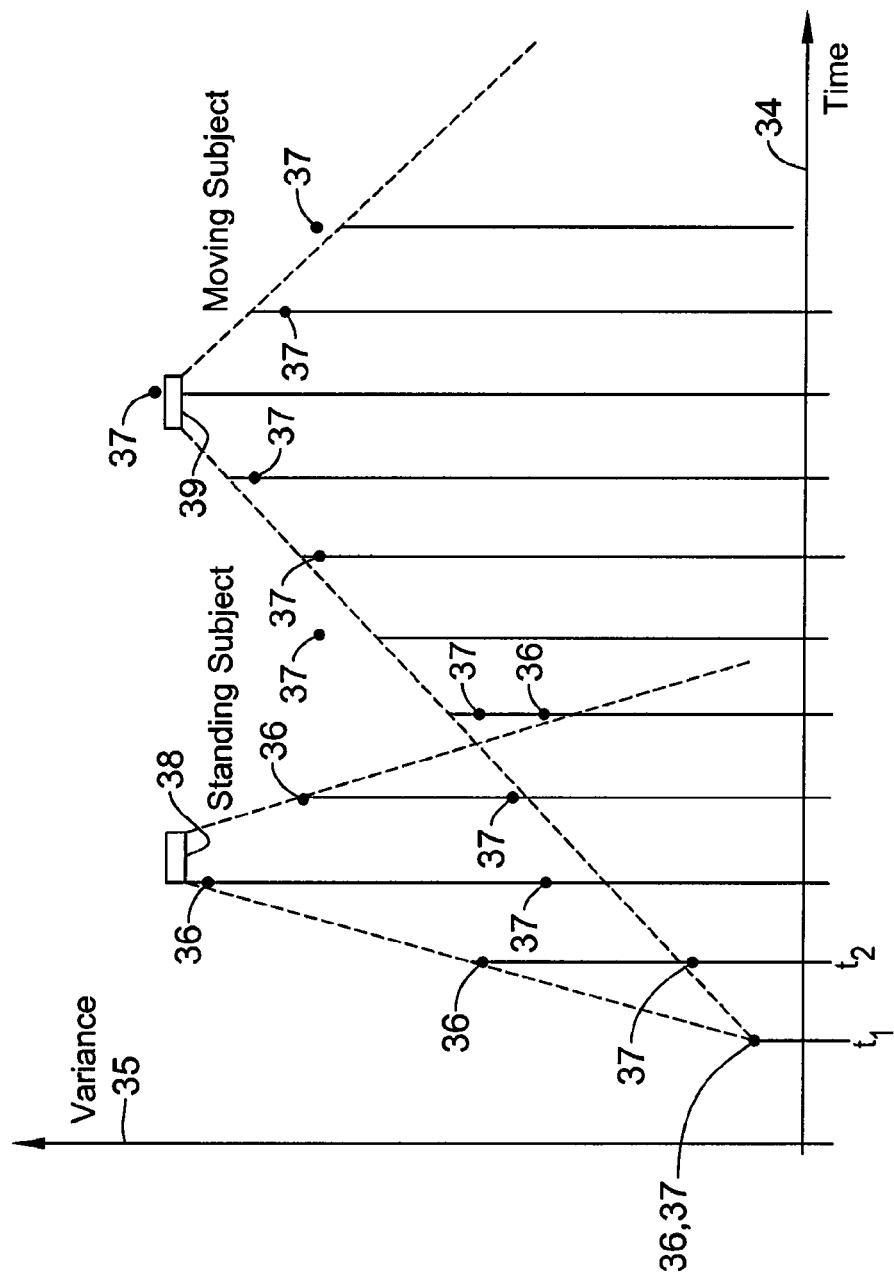
FIG. 14 is a graph which illustrates that greater subject speed means a lower signal-to-noise ratio of the noisy variance data, and thus indicates a need for more sample images to maintain the speed estimation accuracy.

Second, the faster the subject 21 moves, the smaller are the variance increments per sample. If the variance data is noisy, the diminishing increments mean a lower signal-to-noise ratio (FIG. 14). Since the slope $$\frac{d\sigma}{dt}$$

may have to be estimated to determine the subject velocity, $$v_S = v_F + c\frac{d\sigma}{dt}, \quad (13)$$

the number of images needed to maintain the same level of accuracy may go up with the growing subject (21) speed, because while the noise remains the same, the underlying focusing error increments become smaller. The level of noise present in the images may thus indirectly determine the maximum speed the system 10 can reliably handle. FIG. 14 is a diagram which illustrates that greater subject 21 speed means a lower signal-to-noise ratio of the noisy variance data, and thus a need for more sample images to maintain the speed estimation accuracy.

The subject's speed may be determined from the samples (i.e., test images) obtained before the system 10 passes through the first focus, i.e., for $t_n \leq t_F$. The number of these images, $N_{before}$, should be such as to allow a reliable estimation of the slope. The number of samples, $N_{after}$, that need to be collected past the focus point should be such as to allow the algorithm safely decide that, first, the passing has indeed happened and, second, estimate or reconstruct the slope to the right of it well enough to determine the time $t_F$ when it took place. $N_{after}$ is generally smaller than $N_{before}$.

Making the prediction may be done. An optical approach to autofocusing may determine the subject 21 distance from the relationship relating the distance at which a lens is focused, $d_F$, to the values of the lens' zoom, $s_Z$, and focus, $s_F$, and servo set points.

$$d_F=f(s_Z, s_F) \quad (14)$$

For a given lens and its instrumentation, this focus calibration function may be fixed. The focus calibration function may be determined once the system is built and stored as a regression function of the calibration data. When using the regression function, the first item is to ensure that the lens is properly focused on the target whose distance is being estimated. This may explain why there is an interest in determining virtually exactly the time $t_F$ when the lens focus happens to be aligned with the subject's eye. Knowing this time allows a recovery of the zoom, $s_Z(t_F)$, and focus, $s_F(t_F)$, drive positions at that instant and, consequently, also the subject's distance, $$d_S(t_F)=d_F(t_F)=f(s_Z(t_F), s_F(t_F)), \quad (15)$$

which may be used as the initial conditions in the equations for computing an encounter as noted herein. The encounter may be a future situation when the lens focus and subject 21 are aligned again, that is, $$d_S(t_{P_3})=d_F(t_{P_3}), \quad (16)$$

where $t_{P_3}$ is as a yet unknown time when this alignment occurs, and $d_S(t_{P_3})=d_F(t_{P_3})$ is a yet unknown distance from the camera 22, where it is going to take place. If the system 10 knows the time $t_{P_3}$ beforehand, then it may fire the iris camera at that moment, in contrast to the first pass through the correct focus that happened at $t_F$ without the system being aware of it. Also, the system should know the distance $d_F(t_{P_3})$ so that it can get the focus lens in the right place, if necessary. Another part of the prediction is to make sure that the predicted action is feasible, that is, the system has enough time to get everything in place before the time of encounter $t_{P_3}$ arrives.

To obtain the prediction, the equations of motions (3) with the terminal condition (16) should be solved. Since the focus lens velocity has discontinuities, the entire time interval from $t_F$ to $t_{P_3}$ should be broken up into three subintervals $<t_F, t_N>$, $\langle t_N, t_{P_2} \rangle$ and $\langle t_{P_2}, t_{P_3} \rangle$, within which the focus lens speed is constant and has values $v_F$, 0 and $-v_F$, respectively. FIG. 4 illustrates the breakup, with a possible exception. In the Figure, $t_N$ was chosen as the time when the focus lens finished its forward sweep. This is arbitrary, because one may envision an approach in which the focus lens keeps moving even while the system 10 is already going through phase 2, all the way to time $t_{P_2}$. One may note that in phase 3, the focus lens movement appears away from the camera 22, toward the incoming subject 21, and thus the lens' speed has a negative sign.

Phase 3 may be skipped altogether, if executing it would not offer any significant time improvement over just waiting for the subject 21 to move into the encounter distance. If this is the case, then $t_{P_3} = t_{P_2}$.

The following solution may be generic, with all three phases present as shown in the FIG. 4. The times $t_F$, $t_N$ and $t_{P_2}$ may be known to system 10. As it turns out, knowing the distances that $d_S(t_F) - d_F(t_F)$ is not necessary. The equations describing the motions from $t_F$ to $t_N$ may be $$d_S(t_F) = d_F(t_F),\ d_S(t_N) = d_S(t_F) + v_S(t_N - t_F) \text{ and } d_F(t_N) = d_F(t_F) + v_F(t_N - t_F) \quad (17)$$

Phase 2 equations may be $$d_S(t_{P_2}) = d_S(t_N) + v_S(t_{P_2} - t_N) \text{ and } d_F(t_{P_2}) = d_F(t_N). \quad (18)$$

Phase 3 equations may be $$d_S(t_{P_3}) = d_F(t_{P_3}),\ d_S(t_{P_3}) = d_S(t_{P_2}) + v_S(t_{P_3} - t_{P_2}) \text{ and } d_F(t_{P_3}) = d_F(t_{P_2}) - v_F(t_{P_3} - t_{P_2}). \quad (19)$$

Their solution may be the predicted encounter time, $$(t_{P_3} - t_F) = (v_F/(v_S + v_F))\,((t_N - t_F) + (t_{P_2} - t_F)). \quad (20)$$

As could be expected, the encounter time may be a function of time increments and thus independent of the absolute value of the times involved. Thus, one may be free to choose the instant from which one starts measuring time.

The formula (20) may be valid as long as $t_{P_3} \geq t_{P_2}$. This requirement may impose an upper bound, $$(t_{P_2} - t_F) \leq (v_F/v_S)\,(t_N - t_F), \quad (21)$$

on the time $t_{P_2}$. When $t_{P_2}$ reaches its maximum, no time remains for any forthcoming lens focus motion anymore. This would be the last time when the system 10 can still take the iris shot, that is, $t_{P_3\,max} = t_{P_2\,max}$.

$$(t_{P_3\,max} - t_F) = (t_{P_2\,max} - t_F) = (v_F/v_S)\,(t_N - t_F) \quad (22)$$

Equation (22) may also explain why the autofocusing system cycle generally needs to have phase 3. If autofocusing system only passively waited until the subject 21 moved into the right position, then for $v_S \to 0$, the time of encounter may be $t_{P_3\,max} \to \infty$.

Since the encounter instant computation cannot be initiated until the test image sequence is completed, a lower bound on $t_{P_2}$ may be added as well.

$$1 < 1 + ((t_{P_2 min} - t_N)/(t_N - t_F)) \leq (t_{P_2} - t_F)/(t_N - t_F) = 1 + ((t_{P_2} - t_N)/(t_N - t_F)) \leq 1 + ((t_{P_2 max} - t_N)/(t_N - t_F)) = v_F/v_S. \quad (23)$$

The bounds may confirm what has been already established herein, namely, that the speed of the lens focus distance change should not be smaller than the subject speed for the continuous focus sweep autofocusing to work. Additionally, the bounds may also define what the "real time processing" means in the continuous focus sweep autofocusing context.

The time available for computing the encounter instant, $T_C = t_{P_2} - t_N$, may become progressively shorter as the speed ratio $$v_F/v_S \to 1 \quad (24)$$

and shrinks to zero, that is, $t_{P_2} = t_N$, when $v_F = v_S$. That extreme should not be allowed to happen since the system 10 may need some minimal time, $T_{C\,min} = t_{P_2\,min} - t_N > 0$, to do the computation. Thus, the minimal speed ratio should be greater than a threshold whose value depends on how much time the system needs for computation.

$$(v_F/v_S)_{min} = 1 + (T_{C\,min}/(t_N - t_F)) \quad (25)$$

Since $v_F$ is fixed by the optics design, the inequality (25) may limit the maximum subject speed that the autofocusing can handle.

$$v_{S max} = (1/(1 + (T_{C\,min}/(t_N - t_F))))v_F. \quad (26)$$

The difference between equations (22) and (20), $$((v_F/v_S)(t_N - t_F)) - (v_F/(v_S + v_F))(t_N - t_F) - (v_F/(v_S + v_F))\\
(t_{P_2} - t_F) = (v_F/(v_S + v_F))((t_{P_2} - t_F) - (v_F/v_S)(t_N - t_F)) \leq\\
(v_F/(v_S + v_F))((t_{P_2\,max} - t_F) - (v_F/v_S)(t_N - t_F)) - 0,\ (v_F/\\
(v_S v_F))(((t_{P_2} - t_F)/(t_N - t_F)) - (v_F/v_S)) = (v_F/(v_S + v_F))\\
(1 + (T_C/(t_N - t_F))) - (v_F/v_S) \leq 0, \quad (27)$$

may show that if one wants to maximize the speedup through the forthcoming focus lens motion, then one should strive to make the computation time $T_C$ as short as possible.

As a timing device, one may use either the computer clock or design the code so that the computer's components execute in known times or use timing derived from the stepping of the focus lens drive.

The solution (20) may become known to the system 10 sometimes during phase 2. Before accepting it, the system should check if it is not too close to the current time (of which the system is aware) to be realizable, given the system components' timing constraints. If the time is far out, it may likely make sense to actually execute phase 3. If it is close, however, it may make sense to drop phase 3 and recompute the predicted encounter time without it.

Once the autofocusing algorithm decides on $t_{P_3}$, it may determine the set point for the focus lens drive $S_F(t_{P_3})$. The encounter position may be obtained from the focus calibration function, $$d_S(t_{P_3}) = d_F(t_{P_3}) = f(s_Z(t_{P_3}),\ s_F(t_{P_3})). \quad (28)$$

In the FIG. 2, the three phases of the predictive autofocusing cycle were introduced. With the detailed discussion of the cycle herein, the autofocusing concept may be revisited.

The algorithm may start its clock at an arbitrarily chosen time, which may be marked as to, because its choice has no effect on the end result. A more important finding is, however, that the encounter time computation appears to make no direct use of anything that happened before the time, $t_F$, of the first passing through the focus. True, the time as well as the subject 21 speed at that time can be established only in retrospect, no sooner than at $t_N$, and for that purpose, the whole sequence of N test images had to be taken, most of them before the passing through the focus. In this respect, the diagrams sketched in FIGS. 2, 3 and 4 depict the scenarios with standing or slowly moving subjects. If the subject 21 is moving faster and the subject's speed becomes comparable to that of the focus lens, it may take the lens focus much longer to catch up with the subject, and the number of images taken before the passing will be large. Phase 1 may be much longer, but a question may be whether this fact will actually put the optical autofocusing at such a great disadvantage compared to other options such as the use of lidar.

First, one may note that phases 2 and 3 may exist in any predictive autofocusing concept. The formulae used in phase 2 to compute the encounter specifics may be slightly different from those derived herein, but this should be an inconsequential difference. Regardless of the approach used, at the time $t_{P_1}$, the system 10 should know the subject's position and speed to enable the encounter calculations, and it does not matter whether position and speed are absolute (as in the case of lidar) or relative (as in the optical autofocusing). In other words, different predictive autofocusing approaches may substantially differ just in their implementation of phase 1.

It may be the case that a lidar can provide the position and speed measurements of the subject in a shorter time. It might seem, then, that as far as the agility is concerned, the optical autofocusing appears much slower compared to the approaches based on the ranging. An actual benefit of ranging approaches, however, may not be as great as a first look may suggest. A reason is that in actual operation, much of the test image sequence may be taken during transitioning the SLS camera 22 from one subject 21 to the next, an operation that is generally there despite of how the camera is going to be focused.

An example single lens splitter camera 22 may provide high quality iris images that can be used for identification and/or tracking of subjects or individuals 21. A camera system may include a focus camera and an iris camera. The latter may be referred to as sub-cameras. The focus camera may be sensitive to ambient light or some spectrum thereof, while the iris camera may be sensitive to infrared or other spectrum of light. The focus camera and the iris camera may share an optical path that includes one or more lens that capture light, as well as a beam splitter or other optical element that directs light of some wavelengths to the focus camera and allows other wavelengths to reach the iris camera.

Figure 15:
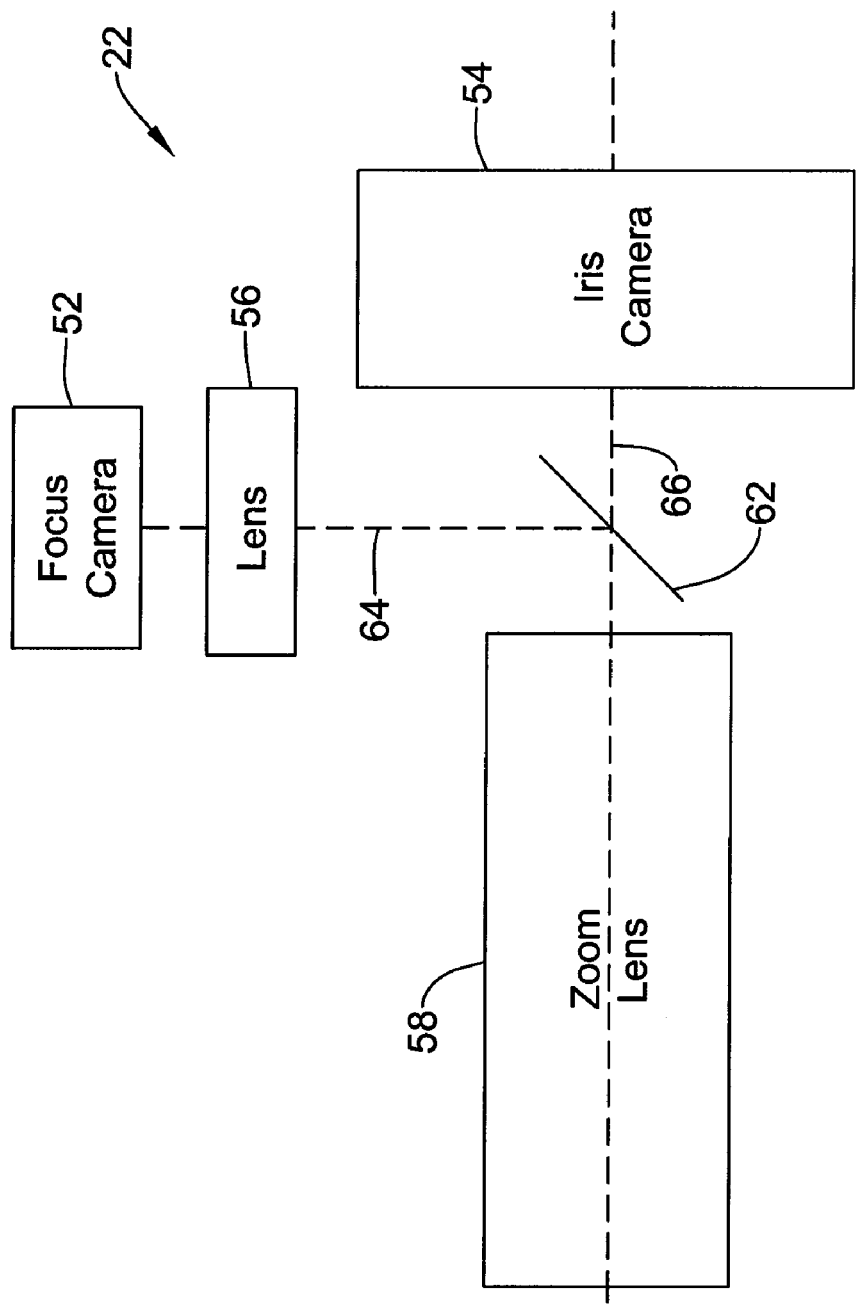
FIG. 15 is a schematic illustration of an example camera system of the present autofocusing system.

FIG. 15 is a diagram of an illustrative example camera system 22, even though other kinds of camera system 22 arrangements may be used herein with system 10. Camera system 22 may include a focus camera 52 and an iris camera 54. In some instances, focus camera 52 may have a considerably lower resolution than iris camera 54, but this is not necessarily required. A lens 56 may be used to provide focus camera 52 with a field of view that is similar to a field of view of iris camera 54. Lens 56 may be excluded, depending on the particular specification and/or configuration of the focus camera 52 and/or the iris camera 54.

Focus camera 52 may be sensitive to ambient light or some spectrum thereof. Focus camera 52 may be any suitable camera that has a sufficiently high frame rate, allows region of interest selection and offers sensitivity to perform an auto-focusing function, such as, for example a PixeLink™ PL-A741 camera. Having a relatively high frame rate may mean that focus camera 52 may have a relatively lower resolution, but this is not always the case. In some cases, focus camera 52 may have a frame rate of at least about 100 frames per second, or a frame every ten milliseconds.

It is contemplated that iris camera 54 may be any suitable camera that is capable of acquiring an iris image in a desired light spectrum and with a desired quality, such as, for example, a REDLAKE™ ES11000 or a ES16000 digital camera. The light spectra used may include, but are not limited to, visible and infrared wavelengths. The desired image quality may depend on an intended security application. For example, higher security level applications typically require higher image quality. The image quality is typically dependent on the entire optical path including both the camera and its optics. For some applications, the minimum iris image quality for various security levels is defined in ANSI standard INCITS M1/03-0590.

Camera system 22 may include a lens 58. While a single lens 58 is illustrated, it will be recognized that in some applications, depending for example on a distance between camera system 22 and a possible subject 21, or perhaps depending at least in part on the particular optics, two or more lenses 58 may be deployed, as desired. Lens or lenses 58 may be configured to provide any desired degree of magnification.

A beam splitter 62 or other optical element may be deployed downstream of lens 58. Beam splitter 62 may be configured to permit some wavelengths of light to pass straight through while other wavelengths of light are deflected at an angle as shown. In some instances, beam splitter 62 may be configured to permit infrared light such as near infrared light (about 700 to about 900 nanometers) to pass through beam splitter 62 towards iris camera 54 while deflecting visible light (about 400 to about 700 nanometers) or some spectrum thereof towards focus camera 52.

As a result, focus camera 52 and iris camera 54 may see the same image, albeit in different wavelengths, and may be considered as sharing an optical path, i.e., through lens 58. Focus camera 52 may be considered as having an optical axis 64 while iris camera 54 may be considered as having an optical axis 66. In some cases, optical axis 64 is perpendicular or at least substantially perpendicular to optical axis 66, but this is not required. Rather, this may be a feature of the optical properties of beam splitter 62. In some instances, a zoom lens 58 may be considered as being disposed along optical axis 66. In some cases, beam splitter 62 may be disposed at or near an intersection of optical axis 64 and optical axis 66, but this is not necessarily required.

Focus camera 52 may be used to move or focus a lens that is part of lens 58. Since focus camera 52 and iris camera 54 see the same image, by virtue of their common optical path, it should be recognized that focusing lens 58 via focus camera 52 may provide an initial focusing for iris camera 54, under ambient lighting conditions. In some instances, focus camera 52 may move the focus lens within lens 58 using one or more servo motors under the control of any suitable auto-focusing algorithm. In some cases, a controller (not shown in FIG. 15) may orchestrate the auto-focusing operation.

Because light of differing wavelengths are refracted differently as they pass through particular materials (glass lenses and the like, for example), focusing lens 58 via one wavelength of light may not provide a precise focus for iris camera 54 at another wavelength of light. In some cases, it may be useful to calculate or otherwise determine a correction factor that may be used to correct the focus of lens 58 after lens 58 has been auto-focused using the focus camera 52, but before the iris camera 54 captures an image. Information regarding such correction may be found in, for example, U.S. patent application Ser. No. 11/681,251, filed Mar. 2, 2007. U.S. patent application Ser. No. 11/681,251, filed Mar. 2, 2007, is hereby incorporated by reference.

FIG. 16 is another schematic illustration of camera system 22, showing some of the functions and interactions of the individual components of camera system 22. Focus camera 52 may perform several tasks, including for example, finding a focus target point (generally indicated at reference number 68) and auto focusing (generally indicated at reference number 70).

Once camera system 22 is pointed at a face, the focus camera 52 (or a separate controller or the like) is tasked with finding a focus target within an image seen or sensed by focus camera 52. In some cases, the focus target may be a predefined point on the focus target, such as a predefined specific point on a face such as an eye pupil or the nose bridge. Once the focus target is located at functionality 68 and focus camera 52 is precisely autofocused on it via functionality 70, it may be necessary to provide a focus correction pertaining to the difference in focal length between the ambient light or some spectrum thereof used to auto-focus the lens, and the wavelength or wavelengths to be captured by the iris camera 54, as indicated at item 70. If or when the subject moves, such as by walking, bending, turning its head, and the like, focus camera 52 may be tasked to focus lens 58 in an ongoing process. Once focus has been achieved, camera system 22 may provide an in-focus flag 72 to initiate iris camera shutter control 74, and in some cases, a flash controller. Iris image data 55 may be provided from camera 54.

Figure 17:
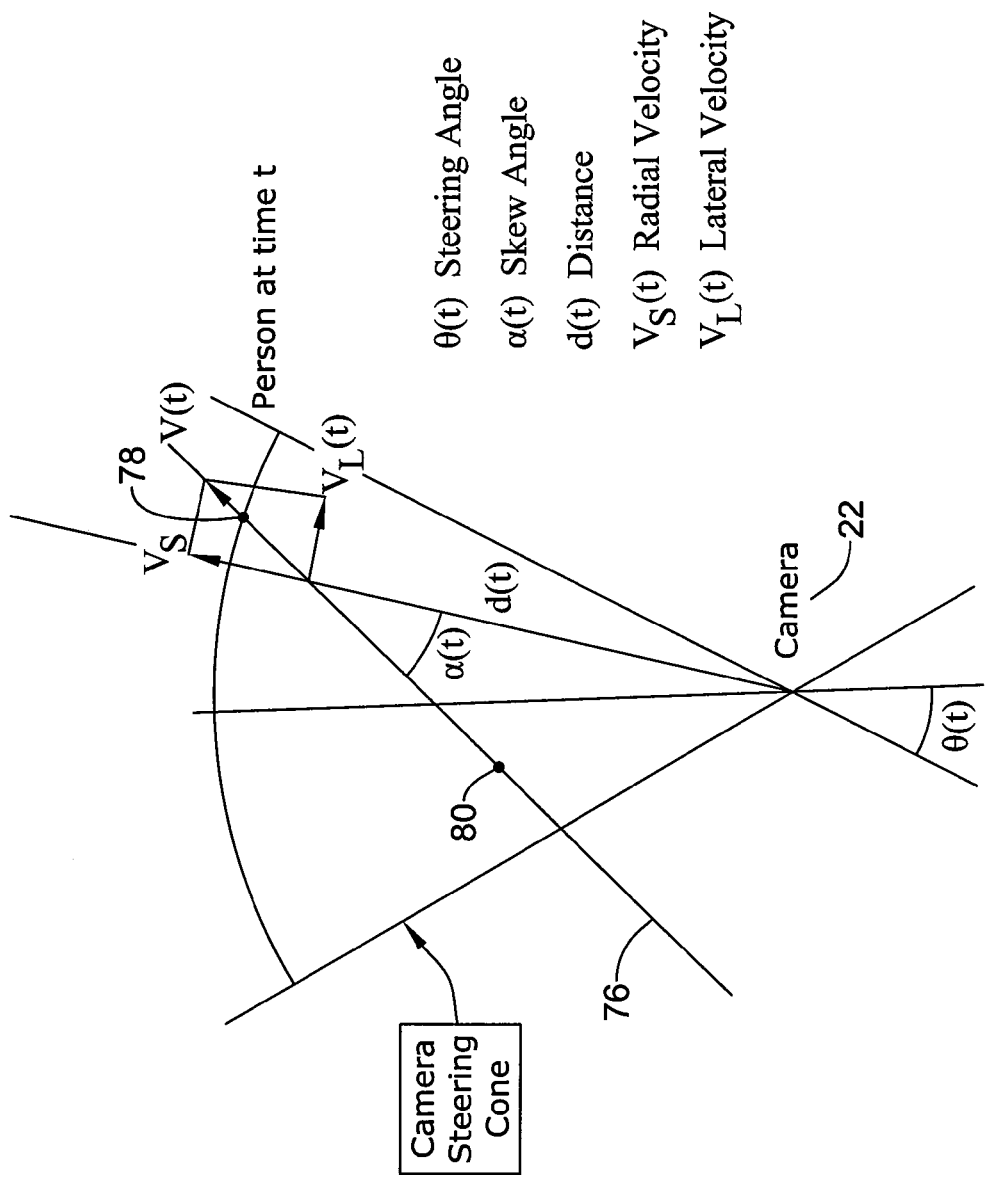
FIG. 17 is a schematic illustration showing how subject movement may be monitored.

In some situations, camera system 22 may be deployed in a position that permits detection and identification of people who are standing or walking in a particular location such as a hallway, airport concourse, and the like. FIG. 17 is a diagram showing how camera system 22 may track a moving individual. In this drawing, an individual is walking or otherwise moving along walking path 76. Camera system 22 may lock onto the individual at point 78 and be able to track the individual until it reaches point 80, or vice versa. Camera system 22 may be configured to lock onto and obtain sufficient iris images in the time between point 78 and point 80, and to identify the individual.

The present illustration makes several assumptions. For example, a steering angle of plus or minus 22.5 degrees (or a total path width of about 45 degrees) may be assumed. It may also be assumed, for purposes of this illustration, that the individual is unaware of being identified and thus is being uncooperative. As a result, the individual happens to walk in a manner that increases the relative angle between the camera and the individual. The person may be detected at a distance of about 2 to 5 meters in this example.

Figure 18:
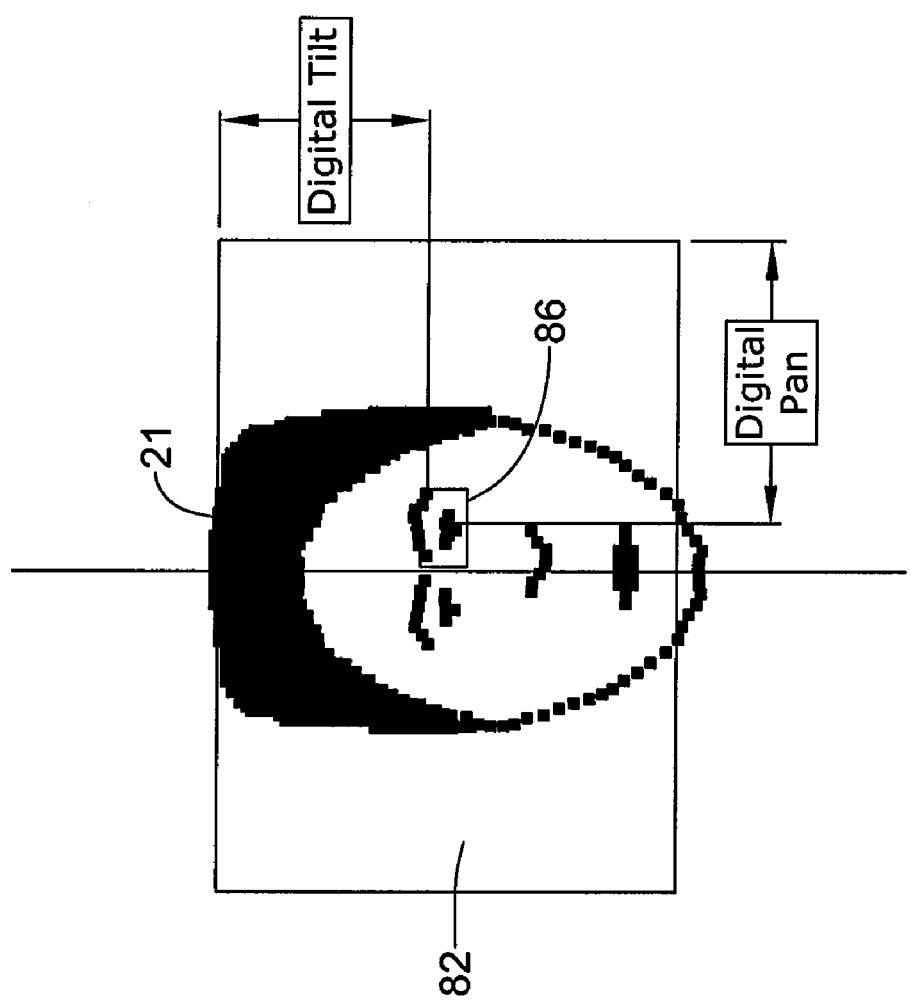
FIG. 18 is a schematic illustration showing how digital tilt and pan may be used to find and track an individual's iris.

FIG. 18 shows digital tilt and pan within a field of view of iris camera 54. In this example, iris camera 54 may be capable of providing an image having about 11 megapixels. At a particular distance, iris camera 54 may have a field of view that is indicated by box 82. Box 82 is in scale relative to a subject or individual 21. A smaller box 86 shows the relative field of view necessary to view the individual's iris. It can be seen that unless the individual 21 moves excessively, iris camera 54 may digitally tilt and/or pan the image to track box 86 within larger box 82 without any need to mechanically adjust its physical pan and tilt. The specific numbers of FIG. 18 may pertain to a particular system design parameter set that, according to the ANSI standard referenced herein, is suitable for a lower security application.

It may be recognized that digital tilt and pan permit a camera to remain pointed at a face without requiring mechanical re-positioning as long as a desired portion of the image, such as a face or a portion of a face, remain within the viewable image. Because focus camera 52 and iris camera 54 have about the same field of view, they may have about the same digital tilt and pan. A focus target algorithm may find the focus target (such as an eye pupil or nose bridge) within the focus camera image and then precisely focus on it.

Figure 19:
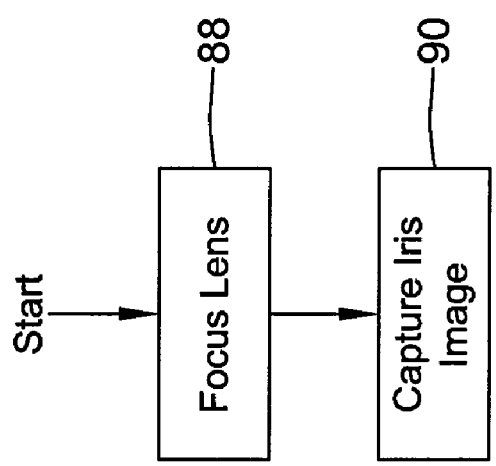
FIG. 19 is a flow diagram showing an approach that may be carried out using the camera system of FIG. 15.

FIG. 19 is a flow diagram showing an illustrative but nonlimiting approach that may be carried out using camera system 22 (FIG. 15). At block 88, the lens may be focused, often under ambient light or some spectrum thereof. In some instances, lens 58 may be focused via an iterative auto-focus algorithm using focus camera 52, sometimes under ambient lighting or some selected spectrum thereof. Control may pass to a block 90, where an iris image is captured. In some instances, an iris image may be captured using iris camera 54, which could be timed with a flash that produces infrared light or any other light having a desired spectrum.

Figure 20:
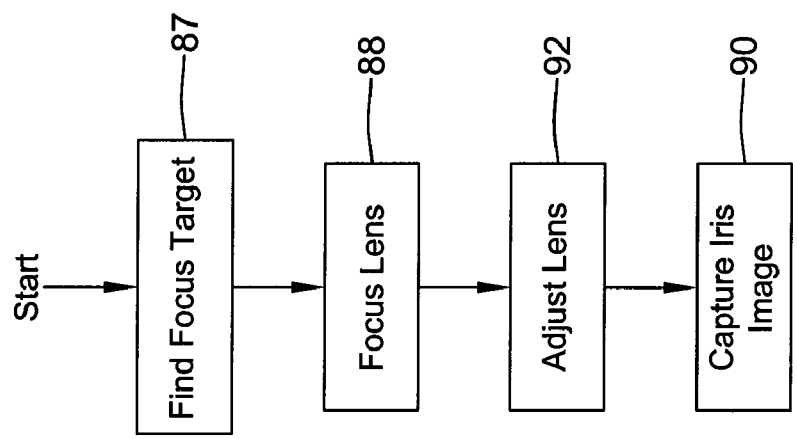
FIG. 20 is a flow diagram showing an approach that may be carried out using the camera system of FIG. 15.

FIG. 20 is a flow diagram showing an illustrative but nonlimiting approach that may be carried out using camera system 22 (FIG. 15). At block 87, a focus target may be located within a focus image. At block 88, the lens may be focused at it. In some instances, lens 58 may be auto-focused via an iterative auto-focus algorithm using focus camera 52 under ambient lighting or some selected spectra thereof. Control may then be passed to block 92, where the lens is adjusted. In some cases, the focus of lens 58 may be adjusted to correct for the differences between, for example, ambient and infrared light. Then, at block 90, an iris image may be captured. In some instances, an iris image may be captured using iris camera 54, which can be timed with a flash that produces infrared or any other desired light.

Figure 21:
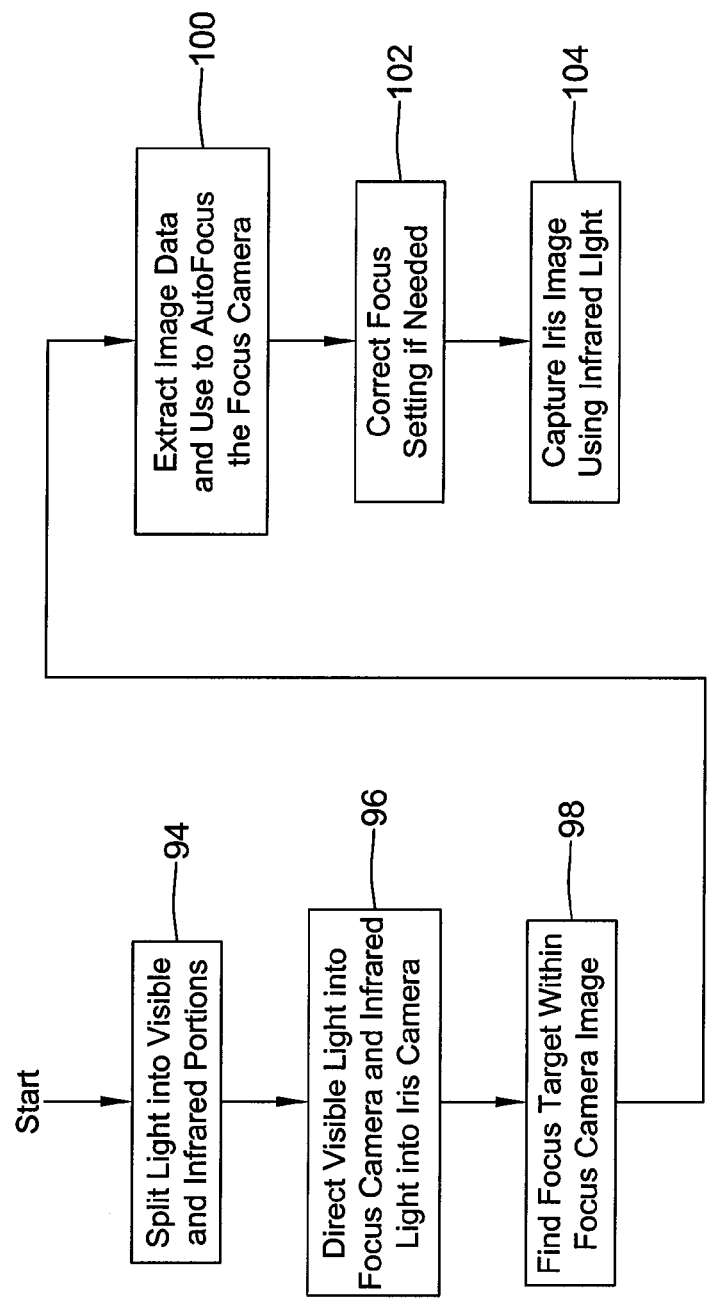
FIG. 21 is a flow diagram showing an approach that may be carried out using the camera system of FIG. 15.

FIG. 21 is a flow diagram showing an illustrative but nonlimiting approach that may be carried out using camera system 22 (FIG. 15). At block 94, light that may be entering camera system 22 is split into an ambient light or some spectrum thereof and an infrared light portion. Control may pass to block 96, where the ambient light portion is directed into or towards focus camera 52, and the infrared light portion is directed into or towards iris camera 54. In some cases, these steps may be achieved by beam splitter 62 (FIG. 15).

At block 98, a focus target may be found within the focus camera image. Image data from a small area surrounding the focus target can be extracted from the focus camera image at block 100, and the extracted data may be used to precisely auto focus the focus camera 52. Control may pass to block 102, where the focus setting is corrected, if necessary, for any differences between the light spectrum used for focusing and the light spectrum used for image acquisition by iris camera 54. Control may pass to block 104, where an iris image is captured using, for example, infrared light sometimes aided by a flash discharge.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A method for autofocusing comprising:
    taking a sequence of images of a subject with a camera;
    extracting image data from a window surrounding an eye of the subject in each image, where the image data includes an intensity variance of an area in each image;
    analyzing the image data from each image in real time;
    determining the subject's position and speed based on the image data, where a change of intensity variance between images of the sequence of images is used to determine the subject's speed;
    estimating a first time of an encounter of the subject from the position and speed determined from the images;
    computing one or more encounters subsequent to the first time of an encounter; and
    taking an image of the subject at one or more times of an encounter; and
    wherein an encounter indicates that at least a portion of the subject is within a focus of the camera.

2. The method of claim 1, wherein computing an encounter is based on intensity variance of an area in the window centered on the eye.

3. The method of claim 2, wherein an encounter is achieved when either just the focus or the subject moves, or both the focus and the subject move.

4. The method of claim 3, wherein upon at least one encounter, the camera takes an image of an iris of the eye.

5. The method of claim 4, wherein the image of the iris is taken under infrared light.

6. The method of claim 5, wherein the camera comprises one or more sensors for taking the sequence of images of a subject and for taking the image of an iris.

7. A predictive autofocusing system comprising:
a camera for taking images of a subject; and
a processor connected to the camera; and
wherein the processor is configured to process each of a series of images from the camera individually and in real time, the processor is configured to analyze the images and determine a position and speed of the subject, and to estimate the time of a future encounter in which the subject will be within a focus of the camera, based on the position and speed of the subject; and
wherein the processor is configured to extract intensity variance data from an area of an eye of the subject in each image and the speed of the subject is determined based on the intensity variance data extracted from each image.

8. The system of claim 7, wherein the processing of images is for determining intensity variance of an area of an eye of the subject to determine whether an amount of focus of the eye in the images is sufficient for an encounter.

9. The system of claim 7, wherein upon an encounter, an image of an iris of an eye of the subject can be captured by the camera.

10. The system of claim 9, wherein an encounter is achieved by movement of either the subject or the focus of the camera, or of both the subject and a focus of the camera.

11. The system of claim 9, wherein the camera is for taking images of the subject in visible light for focusing, and for capturing an image of the iris in infrared light.

12. A method for focusing comprising:
taking images with a camera of a subject, where each image has image data of a window encompassing an eye of the subject and the image data comprises an intensity variance of an imaged feature of the subject;
estimating a position and/or speed of the subject relative to the camera from the intensity variance of the imaged feature of the subject in each of the images;
computing a time of an encounter from the position and/or speed of the subject relative to the camera, wherein the encounter is at a time when the subject will be within focus of the camera; and
taking an image of the subject upon the time of an encounter.

13. The method of claim 12, wherein the intensity variance of the imaged feature of the subject is an intensity variance proximate to the eye of the imaged subject.

14. The method of claim 13, wherein an encounter is indicated when the intensity variance is at a certain level.

15. The method of claim 14, wherein an image of the eye is acquired during an encounter.

16. The method of claim 15, wherein the images having the image data are taken in visible light and the image of the eye is taken in infrared light.

17. The method of claim 14, further comprising deciding whether to move the focus to obtain an encounter, or have the subject move within a depth of the focus, or both.

\* \* \* \* \*